(12) United States Patent
Suzuki et al.

(10) Patent No.: US 6,548,902 B2
(45) Date of Patent: Apr. 15, 2003

(54) SEMICONDUCTOR INTEGRATED CIRCUIT DEVICE, CIRCUIT DESIGN APPARATUS, AND CIRCUIT DESIGN METHOD

(75) Inventors: Kenji Suzuki, Kawasaki (JP); Shogo Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/907,767

(22) Filed: Jul. 19, 2001

(65) Prior Publication Data

US 2002/0083407 A1 Jun. 27, 2002

(30) Foreign Application Priority Data

Dec. 27, 2000 (JP) .......................................... 2000-396420

(51) Int. Cl.⁷ ............................................... H01L 23/48
(52) U.S. Cl. ...................... 257/758; 257/773; 257/774
(58) Field of Search ............................. 716/1, 12, 13; 257/758, 774, 773, 736; 438/622

(56) References Cited

U.S. PATENT DOCUMENTS 5,200,807 A * 4/1993 Eguchi ........................ 257/758
6,100,591 A * 8/2000 Ishii ............................ 257/773
6,403,467 B1 * 6/2002 Akiyama ..................... 438/629
2002/0074660 A1 * 6/2002 Fukusawa ................... 257/758

OTHER PUBLICATIONS

Patent Abstract of Japan No. 04116827 A, dated Apr. 17, 1992.

Patent Abstract of Japan No. 04118968 A, dated Apr. 20, 1992.

* cited by examiner

*Primary Examiner*—Son Mai
(74) *Attorney, Agent, or Firm*—Armstrong Westerman & Hattori, LLP

(57) ABSTRACT

A semiconductor integrated circuit device in which wirings in different layers are connected electrically by vias and in which wiring width at a connection terminal is limited to the maximum width. A plurality of vias are arranged annularly in an area where a wiring in a lower layer and a wiring in an upper layer overlap. A pillar is generated in an area surrounded by the plurality of vias. Locating the pillar will narrow wiring width at a connection terminal for making interlayer connection. Furthermore, the plurality of vias arranged around the pillar will ensure a good connection.

16 Claims, 20 Drawing Sheets

SEMICONDUCTOR INTEGRATED CIRCUIT DEVICE, CIRCUIT DESIGN APPARATUS, AND CIRCUIT DESIGN METHOD

BACKGROUND OF THE INVENTION (1) Field of the Invention

This invention relates to a semiconductor integrated circuit device, a circuit design apparatus, and a circuit design method and, more particularly, to a semiconductor integrated circuit device with a multi-layer wiring structure and a circuit design apparatus and circuit design method for designing interlayer interconnection in semiconductor integrated circuits with a multi-layer wiring structure.

(2) Description of the Related Art

Some semiconductor integrated circuit device have a multi-layer electrode wiring. Computer-aided design (CAD) or the like is generally used for designing semiconductor integrated circuit device with a multi-layer electrode wiring. When circuits are designed, wiring width should be determined with the performance and the like of manufacturing facilities taken into consideration so that high-quality products can be manufactured. The minimum wiring width depends on the accuracy and the like of exposure and etching by manufacturing facilities.

Conventionally, great attention has not been given to the maximum wiring width. In recent years, however, the fact that placing a limit on the maximum wiring width also improves the quality of products has become known.

For example, if an aluminum wiring is too wide, a projection (hillock) will appear due to heat treatment after the formation of the wiring. A wider aluminum wiring is apt to cause a higher hillock. An insulating film formed on a wiring layer will become thin at a place where a hillock has appeared. If a hillock is too high, wirings in lower and an upper layers can short-circuit. Therefore, by limiting wiring width to the maximum width, a wiring short circuit caused by a hillock can be prevented.

Furthermore, if an aluminum wiring is too wide, its upper corners (edge portions) will be rounded out during the process of forming it by etching. That is to say, the top of the wiring will round out. This is a factor that interferes with the planarization of the surface of a chip in a semiconductor circuit device. Failure to planarize the surface of a chip in a semiconductor circuit device will cause the following problems.

In general, with a semiconductor device having the structure of multi-layer wiring structure, each layer must be made planar in order to reduce difference in level on the surface of a semiconductor chip. The reason for this is that the irregularities of the surface of a layer will be accumulated each time an upper layer is formed. That is to say, with an increase in the number of layers the irregularities of the surface of a layer become severer.

Severe irregularities have a bad influence on the process for forming wirings, resulting in a low yield at the time of manufacture.

In recent years copper wirings are sometimes used in order to reduce wiring resistance. The process for forming copper wirings is different from that for forming aluminum wirings. First, grooves are formed by etching in an area on an interlayer insulating film where wirings are to be formed. Then the top of the interlayer insulating film is plated with copper so that the formed grooves is filled up with it. Then extra copper is polished away by a technique called chemical mechanical polishing (CMP) except copper which has filled up the grooves for wirings.

If wiring width is too wide in this process for forming copper wirings, CMP will polish away more copper in grooves for wirings than need be. This leads to dishing. That is to say, a large cavity is formed in the middle of the top of a wiring. This cavity will interfere with the planarization of the surface of a chip. This is the same with an aluminum wiring.

For the various reasons described above, semiconductor circuits must be designed so that wiring width will not exceed the maximum width.

In order to limit wiring width to the maximum width, a pole-shaped insulating area called a pillar or slit is located in an area where wirings should be formed. For example, Japanese Patent Laid-Open Publication No.Hei4-116827 narrows wiring width by locating a plurality of slits in an aluminum electrode wiring in a lower layer in an area where the aluminum electrode wiring in the lower layer and an aluminum electrode wiring in an upper layer overlap.

By the way, interlayer connection can be made by locating a plurality of conductive paths called vias in an area where a wiring in a lower layer and a wiring in an upper layer overlap. If wirings in different layers are connected by a plurality of vias and one of the vias is faulty, the electric connection between the wirings can be maintained through the other vias. Furthermore, interlayer connection by a plurality of vias will reduce interlayer wiring resistance. This carries the advantages of, for example, being able to improve a yield. Sometimes a via is referred to as a via hole, contact hole, or through hole.

The wider an area on a wiring (connection terminal) where vias should be formed is, the greater the number of vias which can be formed becomes. As a result, good electric characteristics can be obtained. However, if the area of a connection terminal is too large, the occurrence of a hillock of an aluminum wiring around the connection terminal, the occurrence of the roundness of an aluminum wiring at the edge portion of a connection terminal, or the occurrence of dishing on the top of a copper wiring at a connection terminal cannot be prevented. This will lead to a low yield. Therefore, a semiconductor integrated circuit device with a connection terminal, the area of which is sufficient to arrange vias and at which wiring width is limited to the maximum width, is needed.

SUMMARY OF THE INVENTION

In order to address such problems, the present invention was made. In other words, an object of the present invention is to provide a semiconductor integrated circuit device in which wirings in different layers are connected electrically by vias and in which wiring width at a connection terminal is limited to the maximum width.

Another object of the present invention is to provide an apparatus and method for designing circuits that can easily design semiconductor circuits in which wiring width in an area for connecting different layers electrically is limited to the maximum width and in which a sufficient number of vias are arranged.

In order to achieve the former object, a semiconductor integrated circuit device with a multi-layer wiring structure is provided. This semiconductor integrated circuit device comprises a first wiring located in a first layer, a second wiring located in a second layer laid over the first layer, and a plurality of vias formed between the first layer and the second layer and arranged annularly in an area where the first wiring and the second wiring overlap.

Furthermore, in order to achieve the latter object, a circuit design apparatus for designing interlayer interconnection in semiconductor integrated circuits with a multi-layer wiring structure is provided. This circuit design apparatus comprises first virtual wiring generating means for generating a first virtual wiring being narrower than a first wiring in a first layer, first via generating means for generating at least one via in an area between a second wiring in a second layer laid over the first layer and the first virtual wiring generated by the first virtual wiring generating means, second virtual wiring generating means for generating a second virtual wiring being narrower than the second wiring in the second layer, and second via generating means for generating at least one via in an area between the first wiring and the second virtual wiring generated by the second virtual wiring generating means.

Moreover, in order to achieve the latter object, a circuit design apparatus for designing interlayer interconnection in semiconductor integrated circuits with a multi-layer wiring structure is provided. This circuit design apparatus comprises edge judging means for judging the edge of an area where a first wiring in a first layer and a second wiring in a second layer overlap and via generating means for generating a plurality of vias in an annular area of a predetermined width from an edge judged by the edge judging means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 1:
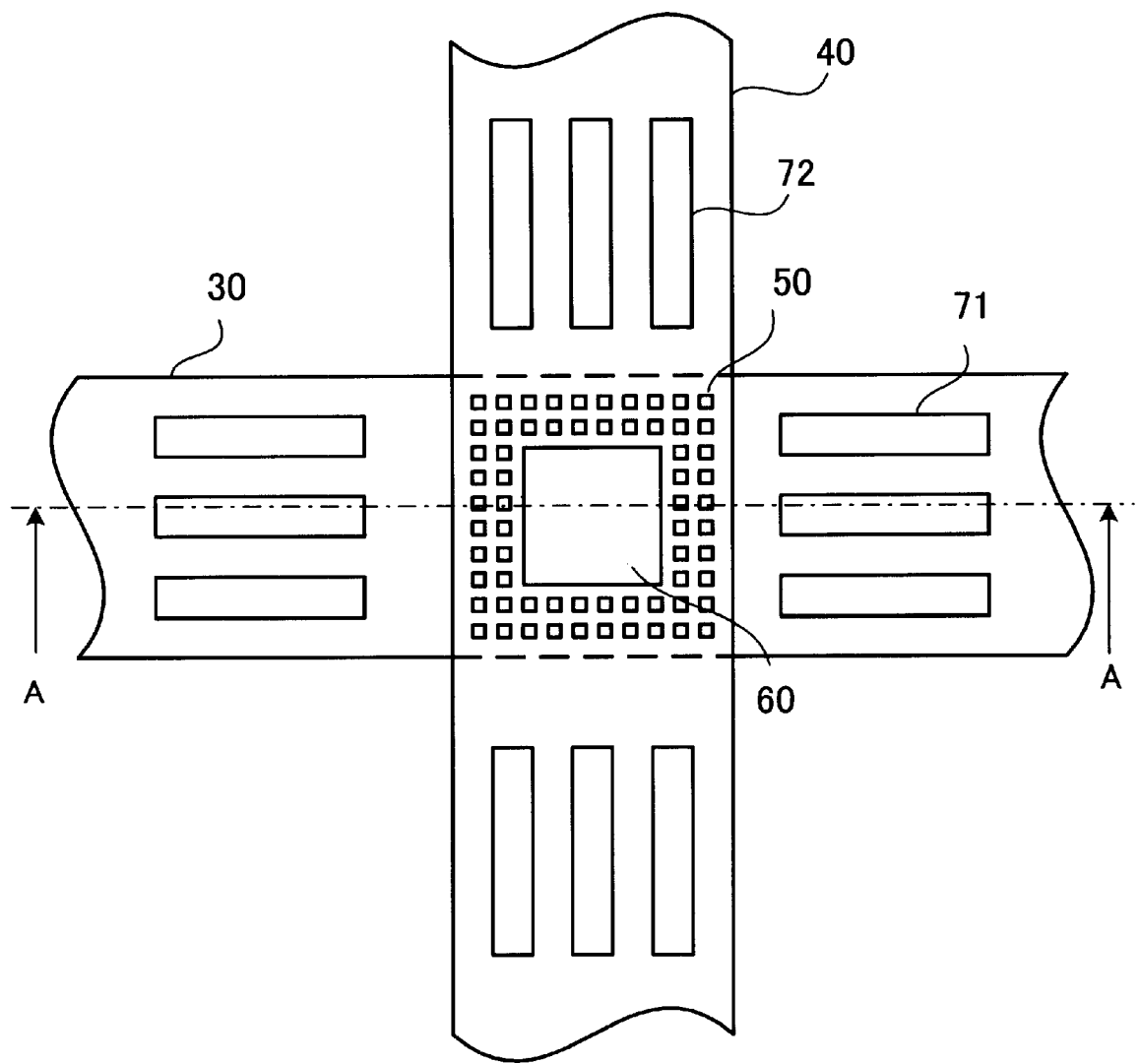
FIG. 1 is a view showing an example of wirings in a semiconductor integrated circuit device according to a first embodiment of the present invention.

FIG. 1 is a view showing an example of wirings in a semiconductor integrated circuit device according to a first embodiment of the present invention. FIG. 1 shows two wirings 30 and 40 formed in different layers. The wirings 30 and 40 are both metal ones. The wiring 30 is formed in a lower layer and the wiring 40 is formed in an upper layer. The wirings 30 and 40 are made of, for example, aluminum or copper. The surfaces of the wirings 30 and 40 are covered with interlayer insulating films. These interlayer insulating films are, for example, silicon oxide films. An interlayer insulating film is also formed between the wirings 30 and 40.

A plurality of vias 50 are formed in an area between the wirings 30 and 40. The plurality of vias 50 are holes made in the interlayer insulating film for making interlayer interconnection. The inside of each via is filled with a conductive member which connects the wirings 30 and 40 electrically. This conductive member is, for example, tungsten (for aluminum wirings), copper (for copper wirings), or the like.

The plurality of vias 50 are arranged annularly along the edge of an area where the two wirings 30 and 40 intersect. Furthermore, a pillar 60 is located in the enter of the area where the wirings 30 and 40 intersect. The pillar 60 is formed to each of the wirings 30 and 40. Pillars 71 and 72 are located in areas where the two wirings 30 and 40 do not overlap. The pillars 62, 71, and 72 are insulating materials formed by gouging out portions of the wirings 30 and 40. Silicon nitride films, silicon oxide films, or the like are used to form them.

Figure 2:
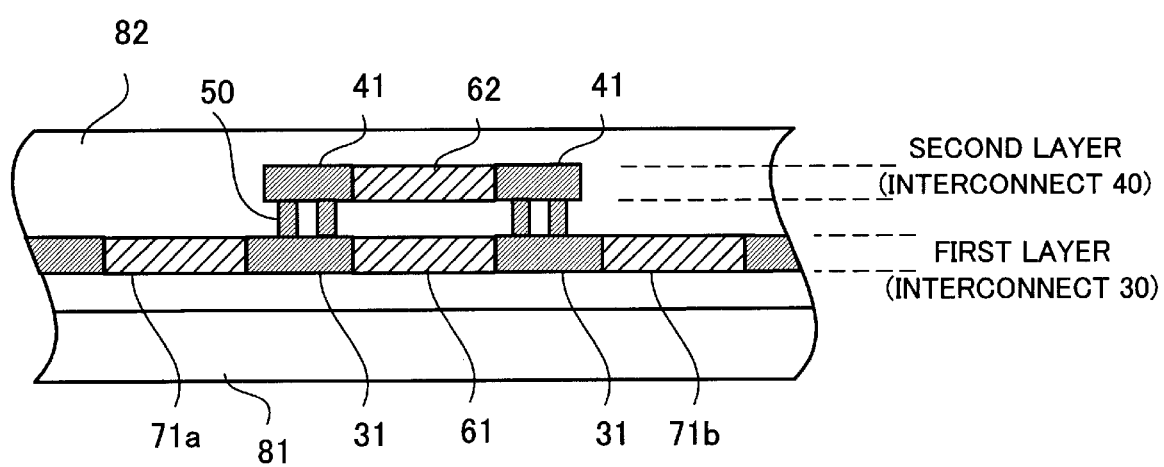
FIG. 2 is a cross-sectional view taken along line A—A of FIG. 1.

FIG. 2 is a cross-sectional view taken along line A—A of FIG. 1. The wirings 30 and 40 are formed on a silicon substrate 81 and are covered with an interlayer insulating film 82. An annular connection terminal 31 is formed around a pillar 61 in the wiring 30 in a first layer. Similarly, an annular connection terminal 41 is formed around a pillar 62 in the wiring 40 in a second layer.

That is to say, the exclusion of the pillar 61 portion from an area in the wiring 30 which intersects the wiring 40 gives the connection terminal 31 for the wiring 30. Similarly, the exclusion of the pillar 62 portion from an area in the wiring 40 which intersects the wiring 30 gives the connection terminal 41 for the wiring 40.

The plurality of vias 50 are formed on the connection terminal 31. The inside of each via is filled with a conductive member. This electrically connects the connection terminal 31 for the wiring 30 in the first layer and the connection terminal 41 for the wiring 40 in the second layer. Pillars 71a and 71b are formed in areas in the wiring 30 in the first layer where the wiring 30 and the wiring 40 do not overlap.

As shown in FIGS. 1 and 2, the plurality of vias 50 are arranged annularly along the edge of an area where the wiring 30 in the lower layer and the wiring 40 in the upper layer overlap, and the pillars 61 and 62 are located in areas which are surrounded by the plurality of vias 50. The connection terminal 31 for the wiring 30 and the connection terminal 41 for the wiring 40 are formed in annular areas which surround the pillars 61 and 62 respectively, so they are narrower than the wirings 30 and 40 respectively. By adjusting the size of the pillars 61 and 62, the wiring width of the connection terminals 31 and 41 can be made smaller than the maximum wiring width.

Now, a method for designing semiconductor integrated circuits with the above wiring circuit will be described. A semiconductor integrated circuit can be designed by the use of CAD software which operates on a computer.

Figure 3:
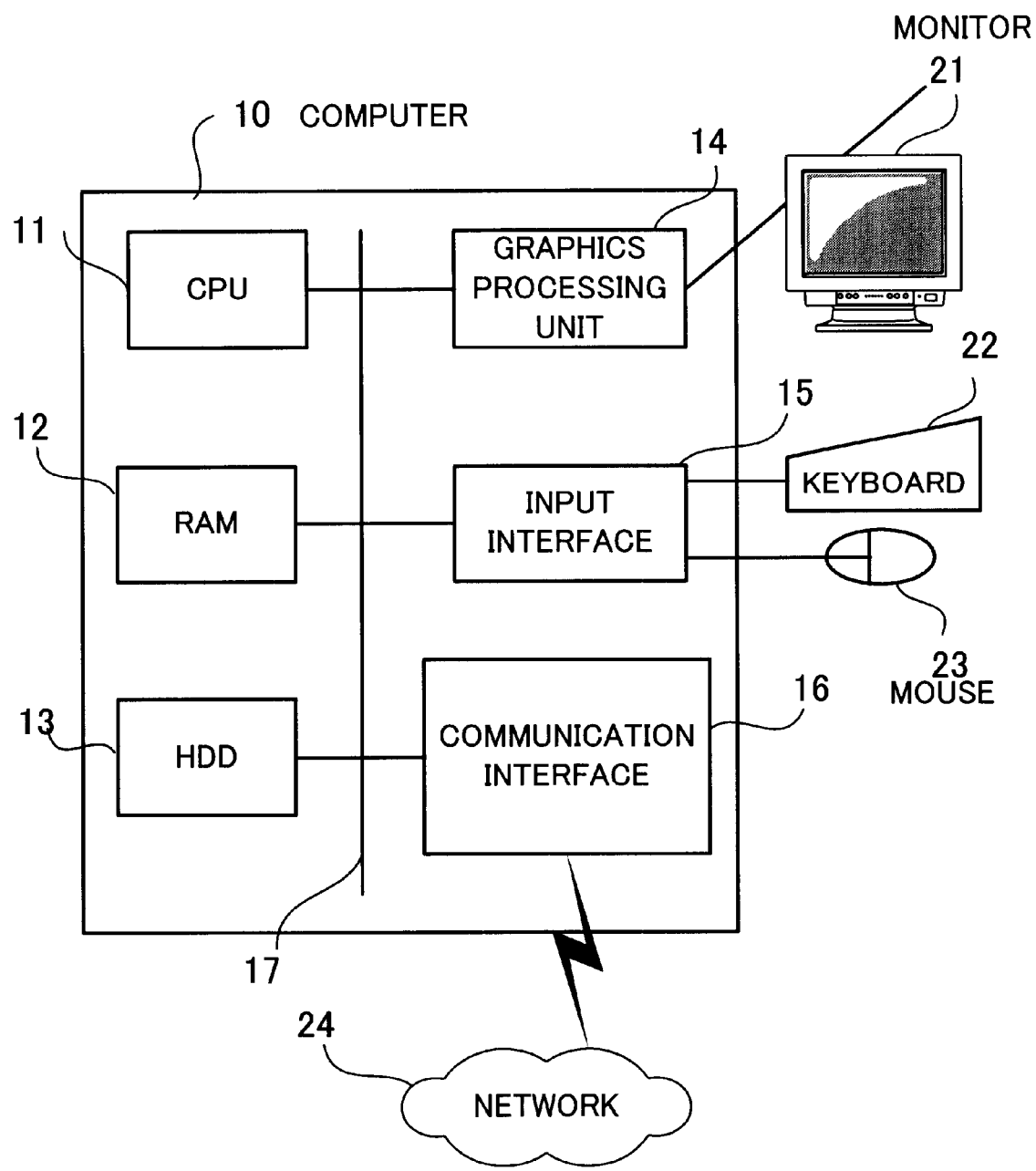
FIG. 3 is a view showing an example of the configuration of a computer used for designing semiconductor integrated circuits.

FIG. 3 is a view showing an example of the configuration of a computer used for designing semiconductor integrated circuits. The whole of a computer 10 is controlled by a CPU 11. A RAM 12, a hard disk drive (HDD) 13, a graphics processing unit 14, an input interface 15, and a communication interface 16 are connected to the CPU 11 via a bus 17.

The RAM 12 temporarily stores at least part of an operating system (OS) and CAD program executed by the CPU 11. The RAM 12 also stores various pieces of data necessary for processing by the CPU 11. The HDD 13 stores the OS and CAD program. The HDD 13 also stores data regarding a wiring circuit diagram.

A monitor 21 is connected to the graphics processing unit 14. The graphics processing unit 14 causes the monitor 21 in compliance with an instruction from the CPU 11 to display images on CAD drawings etc. on its screen. A keyboard 22 and a mouse 23 are connected to the input interface 15. The input interface 15 sends a signal sent from the keyboard 22 or the mouse 23 to the CPU 11 via the bus 17.

The communication interface 16 is connected to a network 24. The network 24 is a wide area network, such as the Internet. The communication interface 16 sends data to or receives data from another computer via the network 24.

Semiconductor integrated circuits are designed by causing the computer 10 with the above configuration to execute a CAD program according to an embodiment of the present invention. When a semiconductor integrated circuit is designed, a circuit diagram is prepared for, for example, every plurality of cells. Then wiring for connecting each cell is designed. Now, a method for designing semiconductor integrated circuits according to an embodiment of the present invention will be described with a case where an inter-cell signal wiring is designed as an example.

Figure 4:
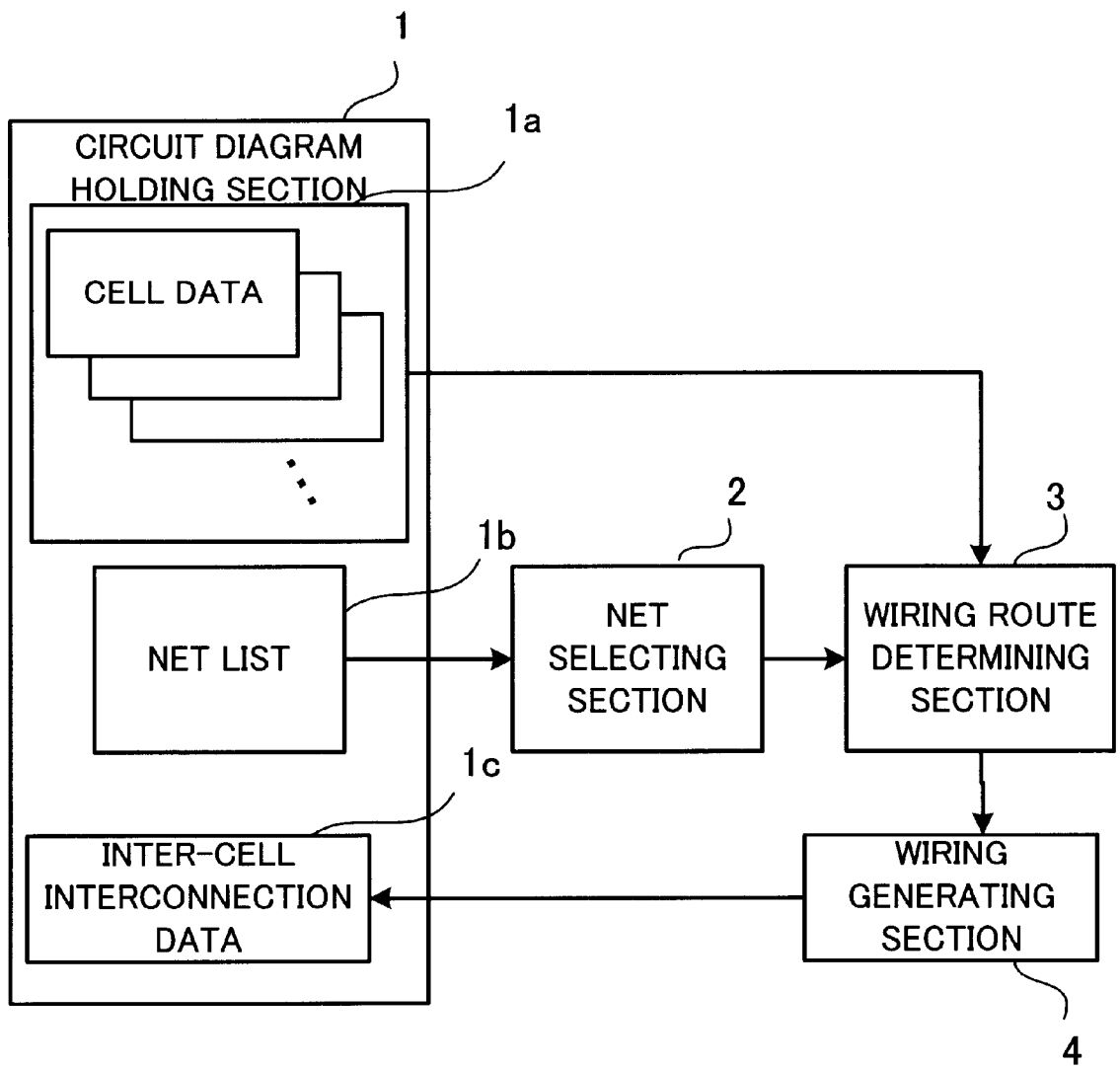
FIG. 4 is a block diagram showing a processing function regarding designing semiconductor integrated circuits.

FIG. 4 is a block diagram showing a processing function regarding designing semiconductor integrated circuits. A circuit diagram holding section 1 holds multiple cell data 1*a*, a net list 1*b*, and inter-cell wiring data 1*c*. The circuit diagram holding section 1 is, for example, a memory area in the HDD 13 shown in FIG. 3.

The multiple cell data 1*a* is a circuit diagram of each block (a semiconductor integrated circuit can be divided into blocks according to functions). Cell data includes data regarding wiring in a cell, such as wiring width and physical information regarding terminals. The physical information regarding terminals includes the coordinates, layers (layer numbers), and width of terminals.

The net list 1*b* is a list of data (nets) which indicates connection relationships among cells. A net is information regarding two or more terminals to be connected to one another which are included in two or more cells. The inter-cell wiring data 1*c* is data regarding wiring for connecting cells. The inter-cell wiring data 1*c* includes data regarding routes for wiring for connecting cells, wiring width, and the location of vias in the case of interlayer interconnection being made.

A net selecting section 2 selects one net from the net list 1*b* when inter-cell wiring is designed. The selected net information is sent to a wiring route determining section 3.

On the basis of the net information sent from the net selecting section 2, the wiring route determining section 3 refers to cell data to which terminals to be connected belong, and obtains physical information regarding the terminals. The physical information it obtains includes the coordinates, layers, and width of the terminals. The wiring route determining section 3 determines a wiring route on the basis of physical information regarding each terminal. The wiring route determining section 3 determines only a route on which a wiring should be formed. In other words, the wiring route determining section 3 does not determine information, such as wiring width.

A wiring generating section 4 generates inter-cell wiring data for forming a wiring on the wiring route determined by the wiring route determining section 3. This inter-cell wiring data generated includes wiring width and the position of pillars, slits, and vias. Inter-cell wiring data generated by the wiring generating section 4 is stored in the circuit diagram holding section 1.

A procedure for designing interlayer interconnection in a semiconductor integrated circuit with a multi-layer wiring structure will now be described. The CPU 11 in the computer 10 will cooperate with other apparatus to perform the following procedure.

Figure 5:
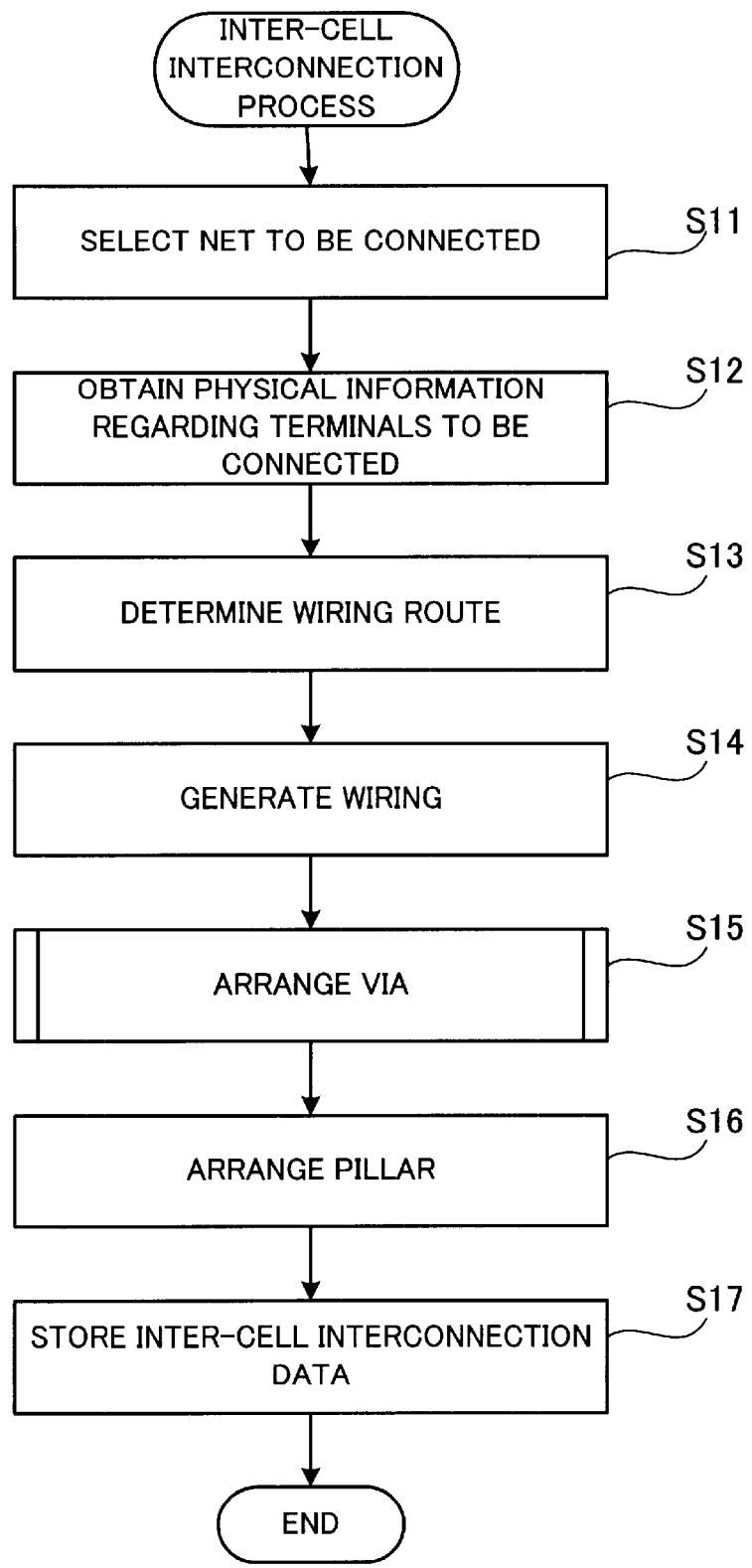
FIG. 5 is a flow chart showing a procedure for designing inter-cell wiring.

FIG. 5 is a flow chart showing a procedure for designing inter-cell wiring. This flow chart will be described with reference to FIG. 4. First, the net selecting section 2 selects one net from the net list 1*b* (step S11). Then the wiring route determining section 3 refers to cell data 1*a* and obtains physical information regarding terminals to be connected (step S12). Then the wiring route determining section 3 determines a wiring route on the basis of the physical information regarding terminals to be connected (step S13). If two terminals to be connected belong to different layers, the wiring route will cross an interlayer at least once. Even if they belong to the same layer, a wiring route via a layer being different from that to which they belong can be determined. In this case, too, the wiring route will cross an interlayer.

After a wiring route being determined, the wiring generating section 4 generates a wiring (step S14). In this step, wiring width etc. are determined. After generating a wiring, the wiring generating section 4 performs the process of arranging vias (step S15). Vias will be arranged at a place where interlayer connection is made (where the wiring route crosses an interlayer). The details of the process of arranging vias will be described later.

After arranging vias, the wiring generating section 4 performs the process of arranging a pillar (step S16). A pillar is arranged, for example, when wiring width is greater than the maximum wiring width predetermined. In a connection terminal for making interlayer connection, a pillar is arranged in an area where vias are not arranged. The wiring generating section 4 stores inter-cell wiring data including information regarding the arrangement of vias and a pillar in the circuit diagram holding section 1 (step S17).

The above flow chart is for designing wirings for signals, but the present invention is also applicable to the interlayer connection of wiring power for source. Wirings for power source, however, can be designed without a net list. For example, a design for wirings for signals in a semiconductor integrated circuit can be preceded by a step called a floor plan. In a floor plan, macro circuits (large cells and memory circuits) and the like are arranged and rough power routes are determined. On the basis of rough power routes determined in this macro plan, detailed power routes are determined and wiring power for source are generated on the power routes determined.

After wiring power for sources being generated, processes being the same as the process of arranging vias (step S15), the process of arranging a pillar (step S16), and the process of storing inter-cell wiring data (step S17) shown in FIG. 5 are performed. This enables to arrange vias and a pillar in an area where the interlayer connection of wings power for source is made.

Figure 6:
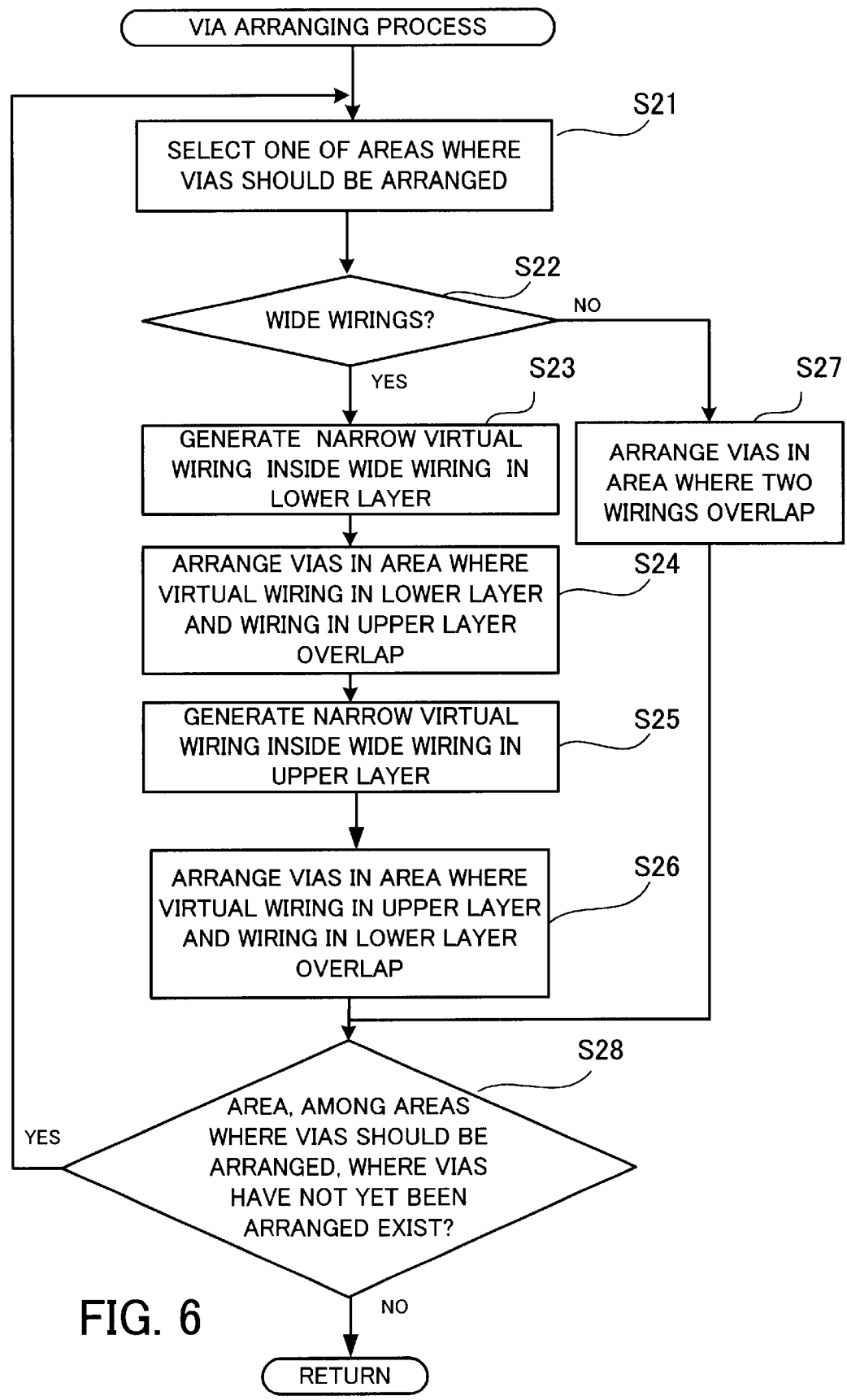
FIG. 6 is a flow chart showing a procedure for arranging vias in the first embodiment of the present invention.

FIG. 6 is a flow chart showing a procedure for arranging vias in the first embodiment of the present invention. The following procedure will be performed by the wiring generating section 4 shown in FIG. 4. This procedure will be performed after the process of generating a wiring (step S14) shown in FIG. 5 is completed.

First, one of areas where vias should be arranged is selected (step S21). An area where vias should be arranged is the area where a wiring route which connects different layers has been determined. The width of wirings in the lower and upper layers of the selected area is checked and whether or not the width of the wirings in both layers is greater than the maximum wiring width (whether or not they are wide wirings) is judged (step S22). The maximum wiring width can be set by a user before he/she begins the process of designing a circuit. Furthermore, the maximum wiring width may be calculated with a computer on the basis of data including quality necessary for manufactured semiconductor integrated circuit device and the accuracy of manufacturing apparatus.

If the wirings in both layers are wide ("YES" in step S22), at least one narrow virtual wiring is generated inside the wide wiring in the lower layer (step S23). This narrow virtual wiring is laid on the original wiring and is narrower than the maximum wiring width. The narrow virtual wiring generated is used only to determine the position of a via and the position and shape of a pillar. It will not be reflected on a circuit diagram. For example, two narrow virtual wirings are generated along the edges of the original wiring. After a narrow virtual wiring is generated on the basis of the wiring in the lower layer, a plurality of vias are arranged in an area where the narrow virtual wiring generated and the wiring in the upper layer overlap (step S24).

Then at least one narrow virtual wiring is generated so as to lie on the wide wiring in the upper layer (step S25). A via is arranged in an area where the narrow virtual wiring generated on the basis of the wiring in the upper layer and the wiring in the lower layer overlap (step S26). After a via is arranged, the procedure proceeds to step S28.

If at least one of the wirings in the upper and lower layers is judged in step S22 to be narrower than the maximum wiring width ("NO" in step S22), then a plurality of vias are arranged in an area where the two wirings in the upper and lower layers overlap (step S27). Then the procedure proceeds to step S28.

After arranging vias in the area selected in step S21 (steps S22 through S27) is completed, whether or not an area, among areas where vias should be arranged, where the process of arranging vias has not yet been performed exists is judged (step S28). If there exists an area on which the process of arranging vias is not yet performed, then the procedure proceeds to step S21. If there is no area on which the process of arranging vias is not yet performed, then the process of arranging vias terminates and the procedure proceeds to step S16 shown in FIG. 5.

This enables to arrange a plurality of vias in an area where two wirings in different layers should be connected. These vias are arranged on a narrow virtual wiring. Therefore, a pillar can be located in an area where a narrow virtual wiring in the lower or upper layer and a wiring in the other layer do not overlap. By locating a pillar at a connection terminal where interlayer connection should be made, wirings around the pillar become narrow. As a result, wiring width at the connection terminal can be made narrower than or equal to the maximum wiring width.

If wiring width at a connection terminal becomes narrower than or equal to the maximum wiring width in this way, the occurrence of a hillock of an aluminum wiring around the connection terminal, the occurrence of the roundness of an aluminum wiring at the edge portion of the connection terminal, or the occurrence of dishing on the top of a copper wiring at the connection terminal can be prevented. This will improve a yield in manufacturing semiconductor integrated circuit device. In addition, a plurality of vias are arranged in an annular area around a pillar. Therefore, interlayer connection can be made reliably and good electric characteristics (low electric resistance, for example) can be obtained.

Now, an example of how to generate vias and pillar will be described with reference to FIGS. 7 through 9.

Figure 7:
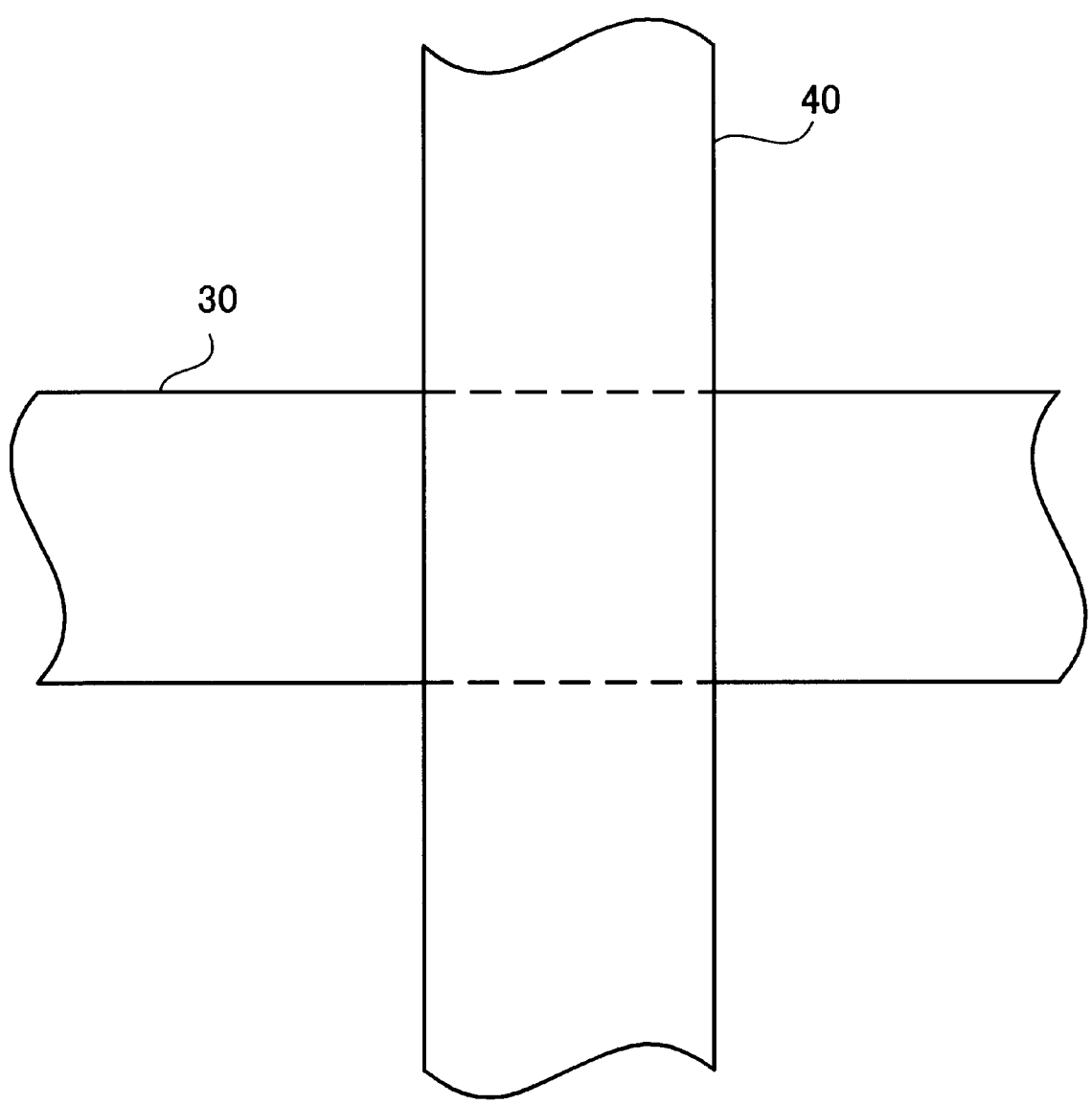
FIG. 7 is a schematic view before vias being generated.

FIG. 7 is a schematic view before vias being generated. In this example, two wirings 30 and 40 of widths greater than the maximum wiring width intersect with each other. The wiring 30 is a metal wiring in a lower layer and the wiring 40 is a metal wiring in an upper layer. It is assumed that circuit design requires that the wirings 30 and 40 should connect electrically at an area where they overlap. In this case, the via arrangement procedure shown in FIG. 6 will be performed. First, a narrow virtual wiring is generated on the basis of the wiring 30 in the lower layer. Then vias are arranged in an area where the virtual wiring generated and the wiring 40 in the upper layer overlap.

Figure 8:
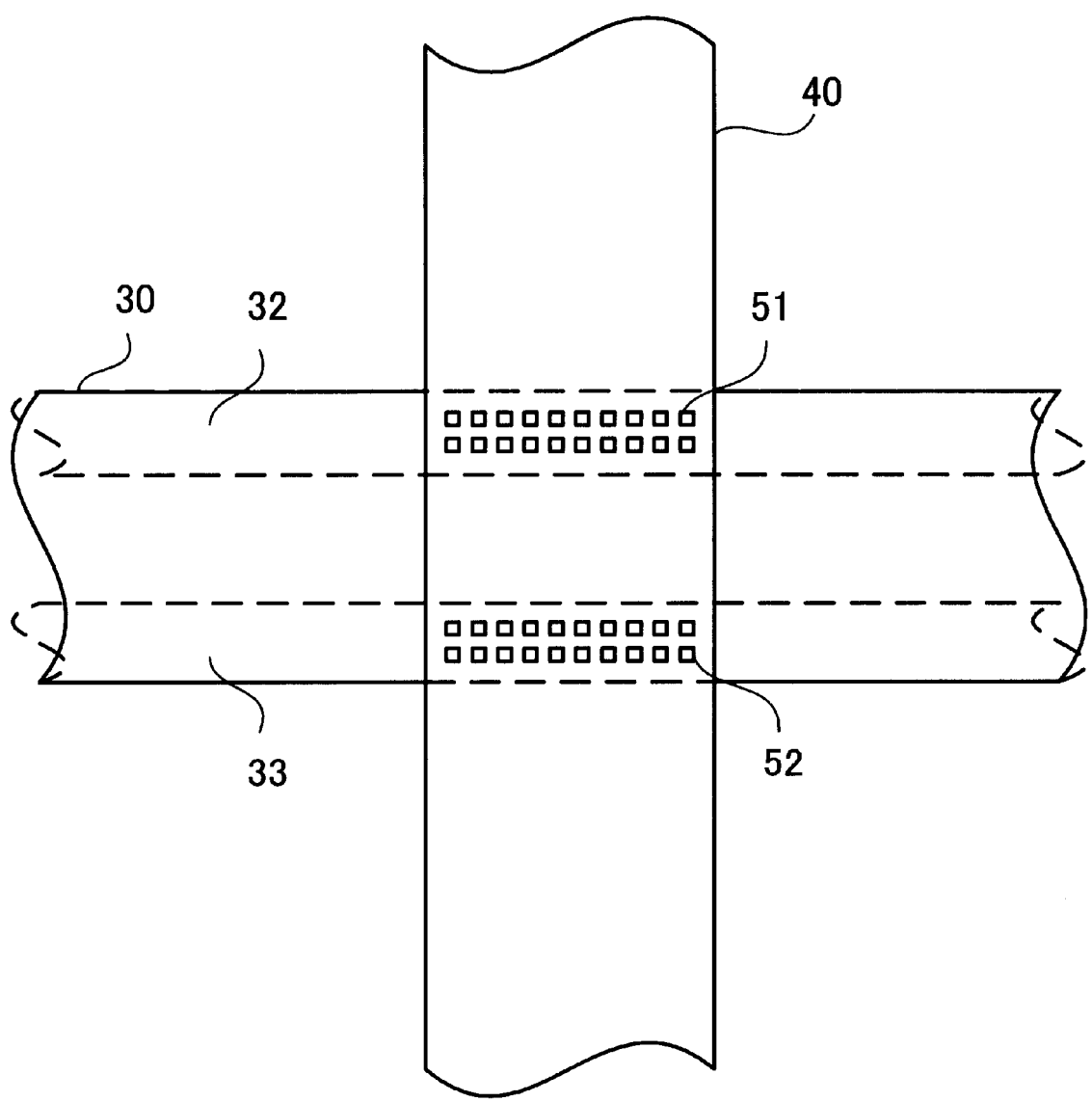
FIG. 8 is a schematic view showing how vias are generated on the basis of narrow virtual wirings in a lower layer.

FIG. 8 is a schematic view showing how vias are generated on the basis of virtual wirings in a lower layer. In this example, two narrow virtual wirings 32 and 33 are generated along the edges of the metal wiring 30 in the lower layer. As shown in FIG. 8, the narrow virtual wirings 32 and 33 are laid on the original wiring 30. A plurality of vias 51 are arranged in an area where the narrow virtual wiring 32 and the wiring 40 in the upper layer overlap. Similarly, a plurality of vias 52 are arranged in an area where the narrow virtual wiring 33 and the wiring 40 in the upper layer overlap.

Figure 9:
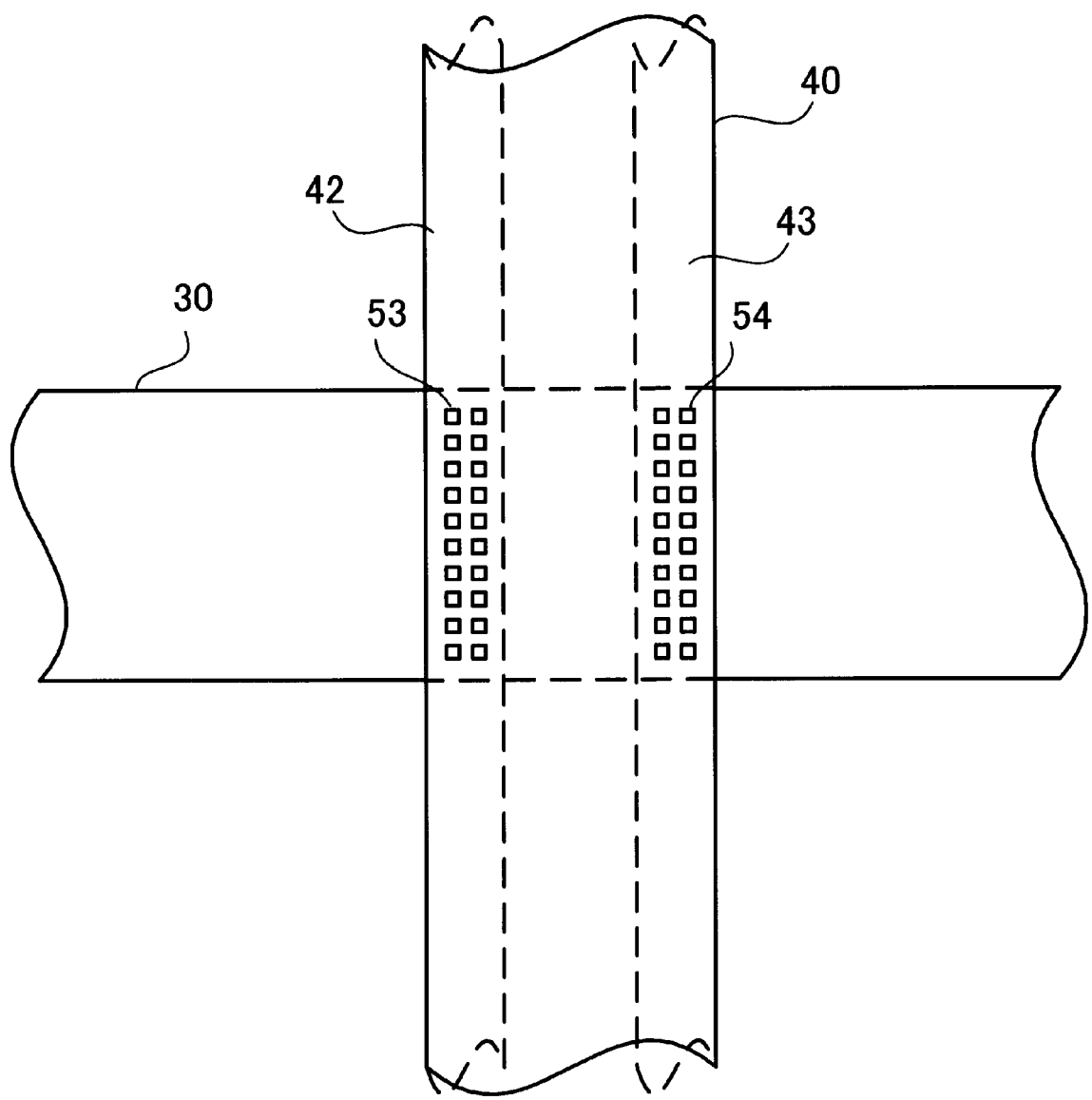
FIG. 9 is a schematic view showing how vias are generated on the basis of narrow virtual wirings in an upper layer.

FIG. 9 is a schematic view showing how vias are generated on the basis of virtual wirings in an upper layer. In this example, two narrow virtual wirings 42 and 43 are generated along the edges of the wiring 40 in the upper layer. As shown in FIG. 9, a plurality of vias 53 are arranged in an area where the narrow virtual wiring 42 and the wiring 30 in the lower layer overlap. Similarly, a plurality of vias 54 are arranged in an area where the narrow virtual wiring 43 and the wiring 30 in the lower layer overlap.

The plurality of vias 50 arranged annularly in FIG. 1 will be generated by combining the plurality of vias 51 and 52 shown in FIG. 8 and the plurality of vias 53 and 54 shown in FIG. 9. If two vias are generated in the same position, only one of them, for example, is left. The circuit diagram shown in FIG. 1 is generated by locating, for example, a rectangular pillar in an area surrounded by vias arranged annularly and locating a rectangular pillar in an area where vias do not need to be arranged.

As has been described in the foregoing, in the first embodiment of the present invention, vias are arranged annularly along the edge of an area where wirings in two layers, being an upper layer and a lower layer, overlap, and a pillar is located in an area surrounded by the vias. This enables to make wiring width narrow even in an area where interlayer connection is made by vias. As a result, the occurrence of a hillock of an aluminum wiring can be prevented, the roundness of the edge portion of an aluminum wiring can be prevented, and the dishing of a copper wiring can be reduced.

In this embodiment, vias are generated annularly in an area where wirings intersect with each other, and a pillar is generated in the center of the area. This structure can make the average pillar density near the intersection area more uniform than the reverse structure in which vias are arranged in the center of the area and a pillar is located around them.

In other words, if vias are generated in the center of the wiring intersection area, vias for interlayer connection will concentrate in the center of the wiring intersection area. This needs an area in the center of the wiring intersection area which is sufficiently wide to arrange all the vias for interlayer connection. A pillar is not located in this area, which makes it difficult to make wiring width narrow.

On the other hand, with the structure in this embodiment in which vias are generated annularly in an wiring intersection area and a pillar is generated in the center of this area, areas where the vias are arranged are scattered. Therefore, wiring width in an area where vias should be arranged can easily be made narrow. As a result, the effects of the prevention of the occurrence of a hillock of an aluminum wiring, the prevention of the roundness of the edge portion of an aluminum wiring, a reduction in the dishing of a copper wiring, and the like can be strengthened.

By the way, there exist various modifications of the arrangement of vias. Modifications of the arrangement of vias will now be described.

Figure 10:
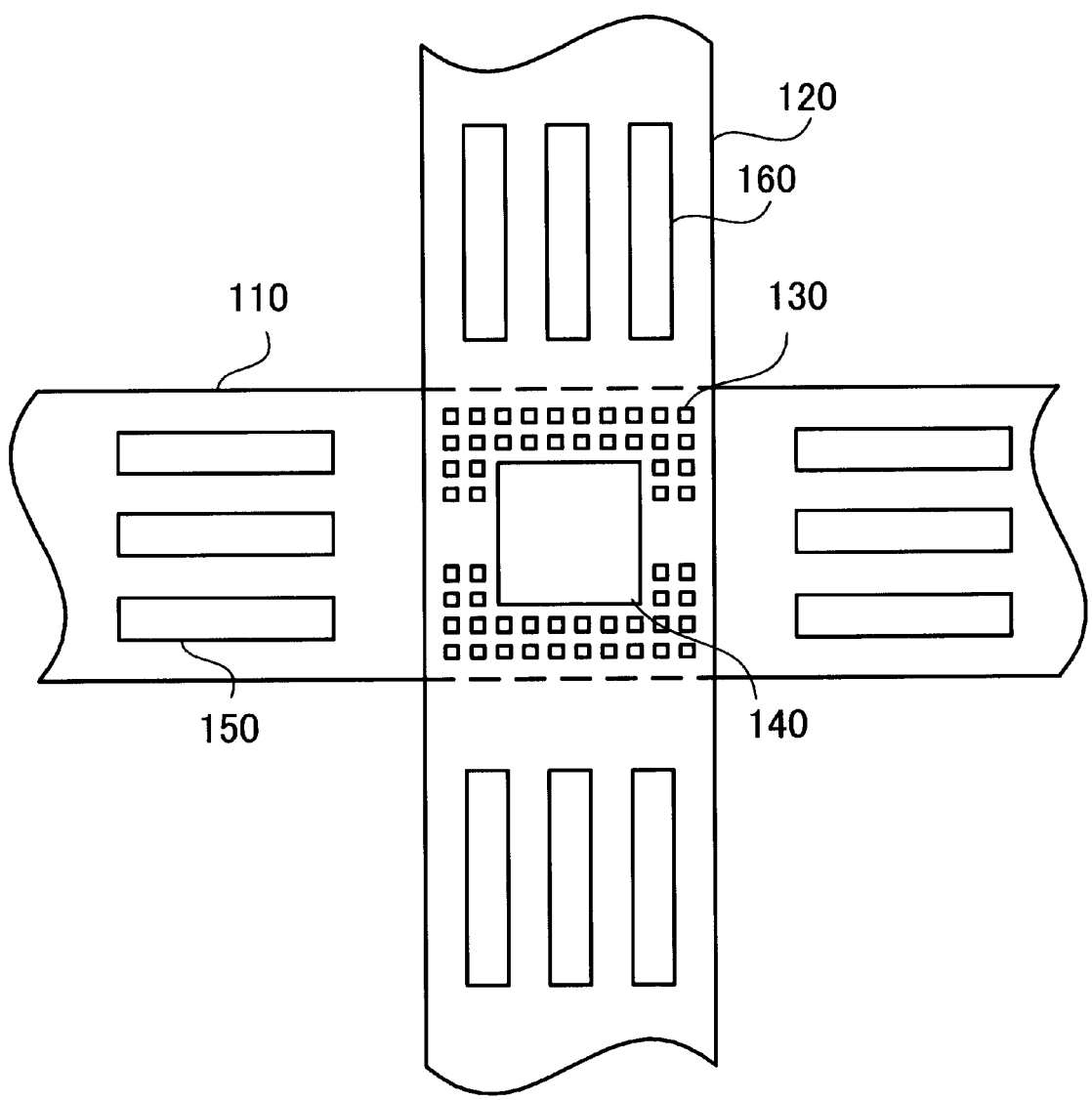
FIG. 10 is a view showing a first modification of the arrangement of vias in the first embodiment.

FIG. 10 is a view showing a first modification of the arrangement of vias in the first embodiment. In this example, a plurality of vias 130 are arranged annularly along the edge of an area where a wiring 110 in a lower layer and a wiring 120 in an upper layer overlap. A row of the vias 130, however, does not form a perfect circle and is severed at two spots.

A pillar 140 is located in an area surrounded by the plurality of vias 130. Moreover, a pillar 150 is located in an area in the wiring 110 where the wiring 110 and the wiring 120 do not overlap. A pillar 160 is located in an area in the wiring 120 where the wiring 110 and the wiring 120 do not overlap. As shown in FIG. 10, the plurality of vias 130 arranged annularly do not have to form a perfect circle.

Figure 11:
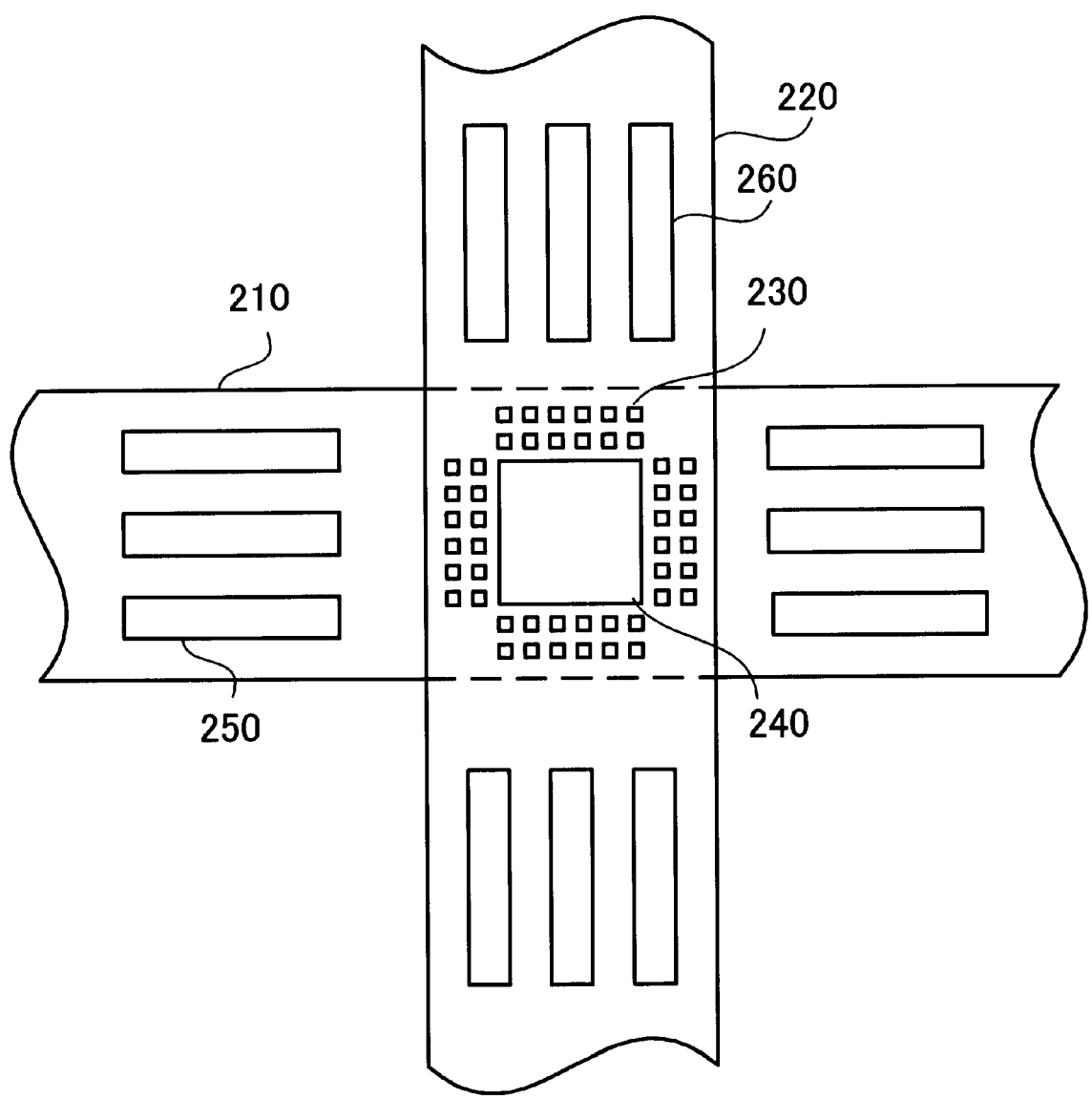
FIG. 11 is a view showing a second modification of the arrangement of vias in the first embodiment.

FIG. 11 is a view showing a second modification of the arrangement of vias in the first embodiment. In this example, a plurality of vias 230 are arranged annularly along the edge of an area where a wiring 210 in a lower layer and a wiring 220 in an upper layer overlap. A via, however, is not arranged at the corners of the area where the wiring 210 and the wiring 220 overlap.

A pillar 240 is located in an area surrounded by the plurality of vias 230. Moreover, a pillar 250 is located in an area in the wiring 210 where the wiring 210 and the wiring 220 do not overlap. A pillar 260 is located in an area in the wiring 220 where the wiring 210 and the wiring 220 do not overlap.

In this example, a circle formed by the plurality of vias 230 arranged annularly is severed at four spots. As shown in FIG. 11, a plurality of vias arranged annularly may be divided into four groups arranged in series.

Figure 12:
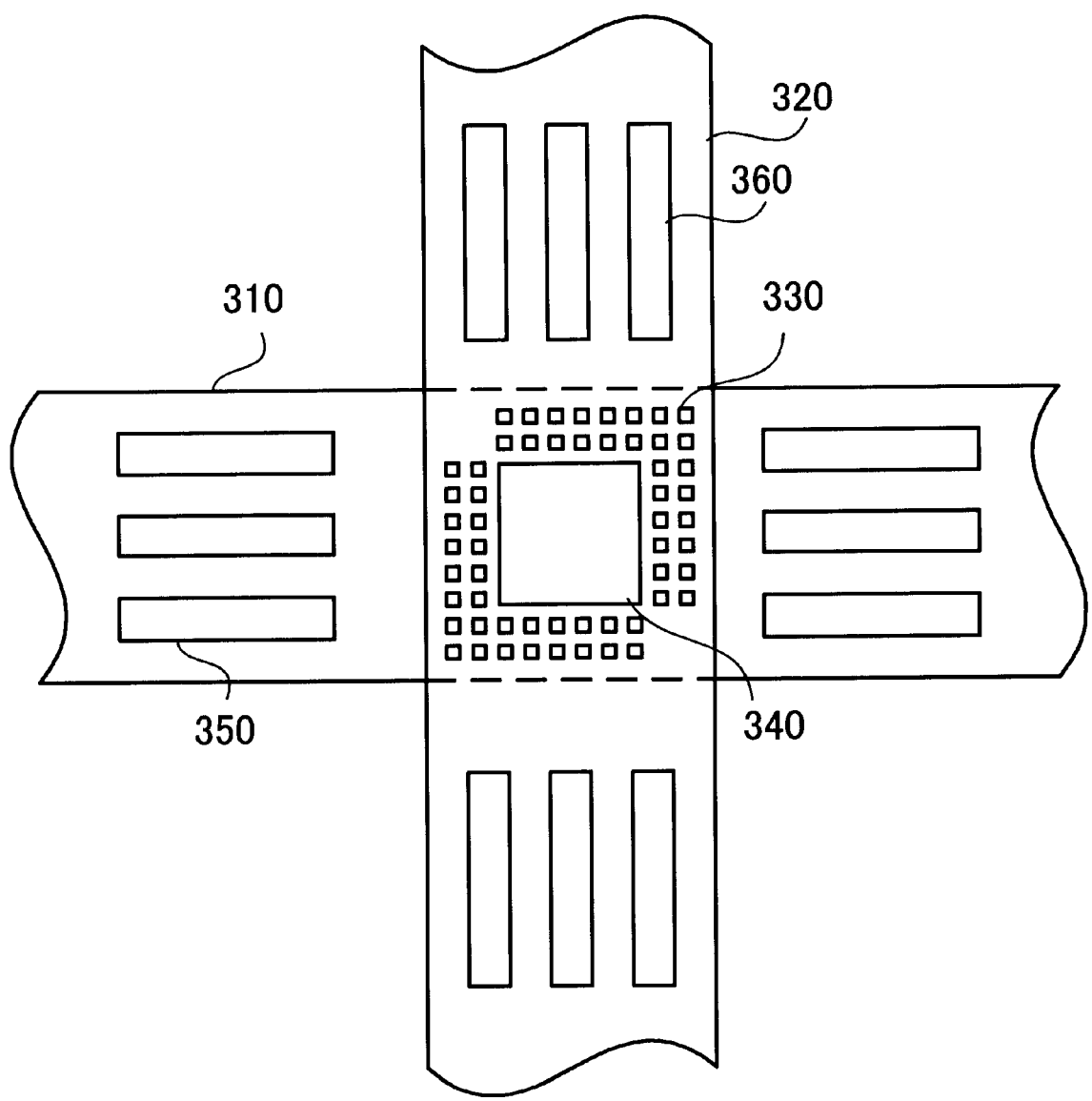
FIG. 12 is a view showing a third modification of the arrangement of vias in the first embodiment.

FIG. 12 is a view showing a third modification of the arrangement of vias in the first embodiment. In this example, a plurality of vias 330 are arranged annularly along the edge of an area where a wiring 310 in a lower layer and a wiring 320 in an upper layer overlap. A via, however, is not arranged at two corners (the upper left and lower right corners in FIG. 12) of the area where the wiring 310 and the wiring 320 overlap.

A pillar 340 is located in an area surrounded by the plurality of vias 330. Moreover, a pillar 350 is located in an area in the wiring 310 where the wiring 310 and the wiring 320 do not overlap. A pillar 360 is located in an area in the wiring 320 where the wiring 310 and the wiring 320 do not overlap.

In this example, a circle formed by the plurality of vias 330 arranged annularly is severed at two spots. As shown in FIG. 12, the plurality of vias 330 arranged annularly may be divided into two groups.

Figure 13:
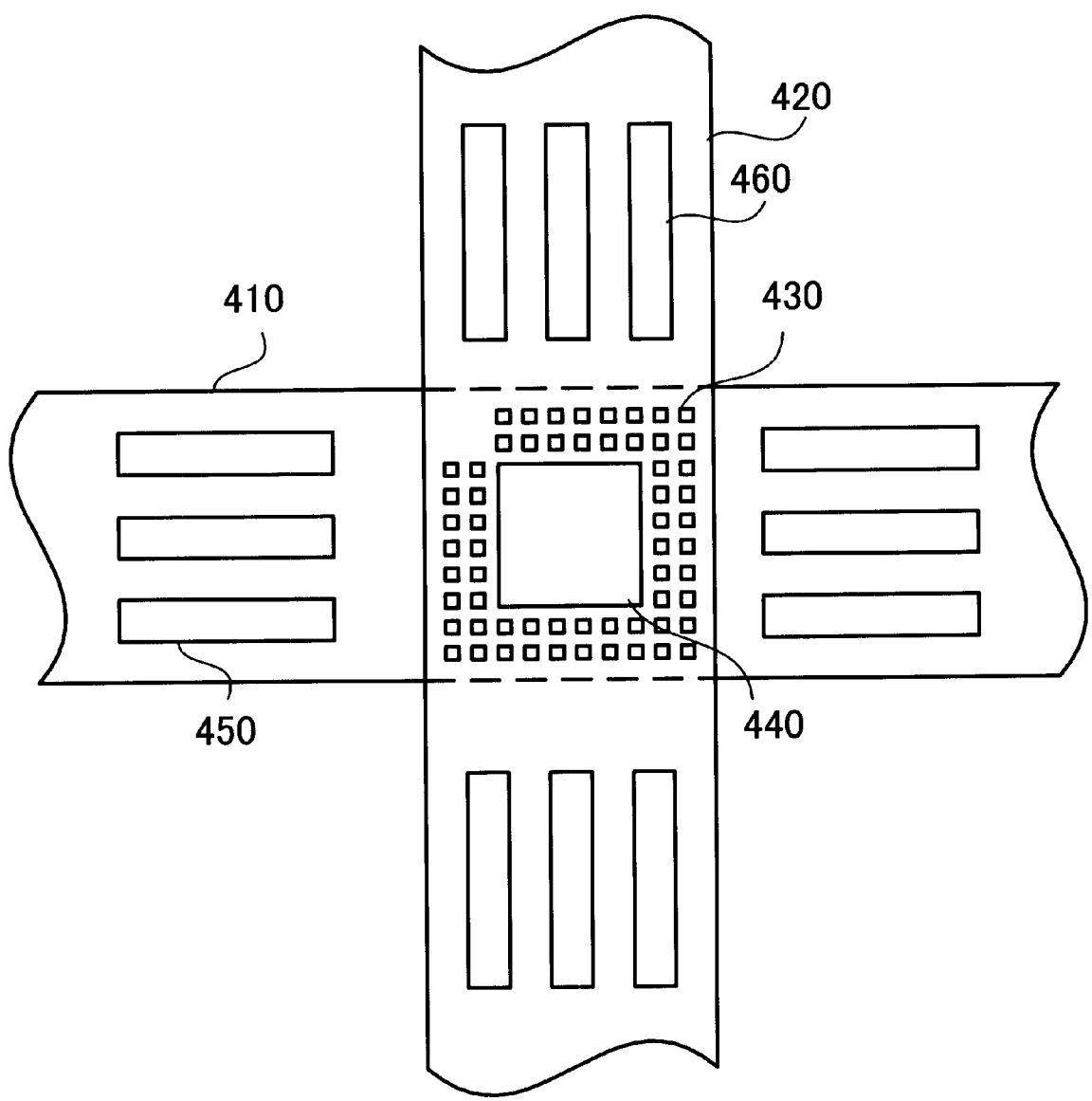
FIG. 13 is a view showing a fourth modification of the arrangement of vias in the first embodiment.

FIG. 13 is a view showing a fourth modification of the arrangement of vias in the first embodiment. In this example, a plurality of vias 430 are arranged annularly along the edge of an area where a wiring 410 in a lower layer and a wiring 420 in an upper layer overlap. A via, however, is not arranged at only one corner (the upper left corner in FIG. 13) of the area where the wiring 410 and the wiring 420 overlap.

A pillar 440 is located in an area surrounded by the plurality of vias 430. Moreover, a pillar 450 is located in an area in the wiring 410 where the wiring 410 and the wiring 420 do not overlap. A pillar 460 is located in an area in the wiring 420 where the wiring 410 and the wiring 420 do not overlap. In this example, a circle formed by the plurality of vias 430 arranged annularly is severed at one spot. As shown in FIG. 13, the plurality of vias 430 arranged annularly do not have to form a perfect circle.

A fifth modification will now be described. In the above examples, one wiring in an upper layer and one wiring in a lower layer are connected. However, two wirings in a lower layer and one wiring in an upper layer can be connected. Such a case will now be described.

Figure 14:
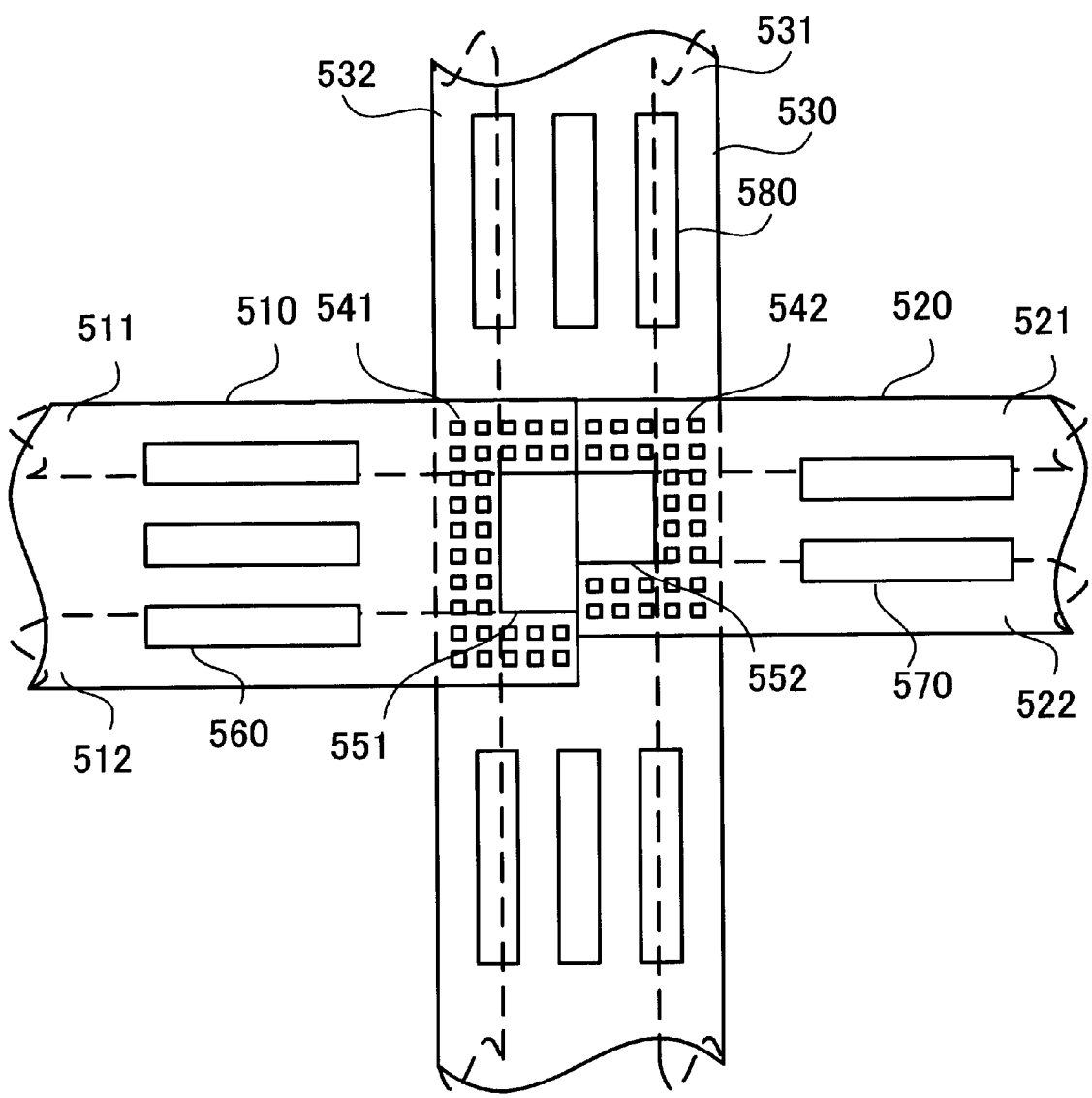
FIG. 14 is a view showing a fifth modification of the arrangement of vias in the first embodiment.

FIG. 14 is a view showing a fifth modification of the arrangement of vias in the first embodiment. In this example, two wirings 510 and 520 of different widths are formed in a lower layer. The wirings 510 and 520 touch at the edge. The wirings 510 and 520 in the lower layer and a wiring 530 in the upper layer overlap at a place where the wirings 510 and 520 touch. That is to say, in the intersection area, each wiring in the lower layer extends only to the vicinity of the middle of the wiring in the upper layer.

In this example, when vias are arranged, narrow virtual wirings 511 and 512 are generated on the basis of the wiring 510 and narrow virtual wirings 521 and 522 are generated on the basis of the wiring 520. Narrow virtual wirings 531 and 532 are also generated on the basis of the wiring 530 in the upper layer. Then a plurality of vias 541 are arranged in an area where the wiring 510 in the lower layer and the wiring 530 in the upper layer overlap. Furthermore, a plurality of vias 542 are arranged in an area where the wiring 520 in the lower layer and the wiring 530 in the upper layer overlap.

In an area where the wiring 510 and the wiring 530 overlap, a pillar 551 is located in an area where the vias 54i are not arranged. Moreover, in an area where the wiring 520 and the wiring 530 overlap, a pillar 552 is located in an area where the vias 542 are not arranged. A pillar 560 is formed in an area in the wiring 510 where the wiring 510 and the wiring 530 do not overlap. A pillar 570 is formed in an area in the wiring 520 where the wiring 520 and the wiring 530 do not overlap. A pillar 580 is formed in an area in the wiring 530 where the wiring 530 and the wirings 510 and 520 do not overlap.

As shown in FIG. 14, even if two wirings in a lower layer exist in an area where vias should be arranged, the vias can be arranged on a connection terminal where wiring width is narrow. Even if two wirings in an upper layer exist in an area where vias should be arranged, the vias can be arranged in the same way.

Figure 15:
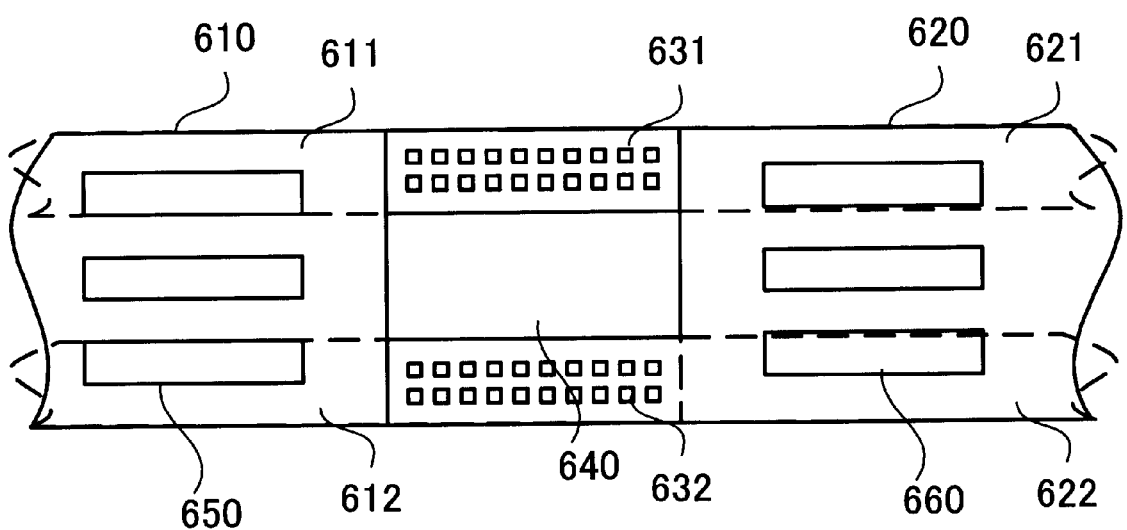
FIG. 15 is a view showing a sixth modification of the arrangement of vias in the first embodiment.

FIG. 15 is a view showing a sixth modification of the arrangement of vias in the first embodiment. In this example, a wiring 610 in a lower layer and a wiring 620 in an upper layer are placed in parallel. The right end of the wiring 610 and the left end of the wiring 620 overlap.

Two narrow virtual wirings 611 and 612 are generated on the basis of the wiring 610 in the lower layer and two narrow virtual wirings 621 and 622 are generated on the basis of the wiring 620 in the upper layer. A plurality of vias 631 are arranged in an area where the narrow virtual wiring 611 and the narrow virtual wiring 621 overlap. Similarly, a plurality of vias 632 are arranged in an area where the narrow virtual wiring 612 and the narrow virtual wiring 622 overlap. In an area where the wiring 610 in the lower layer and the wiring 620 in the upper layer overlap, a pillar 640 is formed in an area where the plurality of vias 631 and 632 are not arranged.

As a result, the plurality of vias 631 and 632 are arranged along the edges of an area where the two wirings 610 and 620 overlap. A pillar 650 is located in an area in the wiring 610 where the wiring 610 and the wiring 620 do not overlap. Moreover, a pillar 660 is located in an area in the wiring 620 where the wiring 620 and the wiring 610 do not overlap.

As stated above, even if a wiring in a lower layer and a wiring in an upper layer are placed in parallel, vias can be arranged in an area where the wirings overlap.

In the above example two virtual wirings are generated along the edges of the original wiring, but a virtual wiring may be generated near the middle of the original wiring. There is no limit to the number of virtual wirings generated. One, two, three or more virtual wirings can be generated.

Now, a second embodiment of the present invention will be described. In the second embodiment, an area where vias should be arranged is determined by judging the edge of an area where two wirings overlap. In the sixth modification of the first embodiment shown in FIG. 15, for example, the two wirings in the upper and lower layers are parallel, so vias are arranged along two sides (the upper and lower sides in FIG. 15) of the rectangular area where the two wirings overlap. In such a case, a plurality of vias can be arranged to form a perfect circle by judging the edge of an area where two wirings overlap and by arranging the vias in an area having constant width from the edge. Such an example will now be described as the second embodiment.

A processing function for realizing the second embodiment is the same as that shown in FIG. 4. Moreover, processes other than the process of arranging vias are the same as those shown in FIG. 4, so descriptions of them will be omitted.

Figure 16:
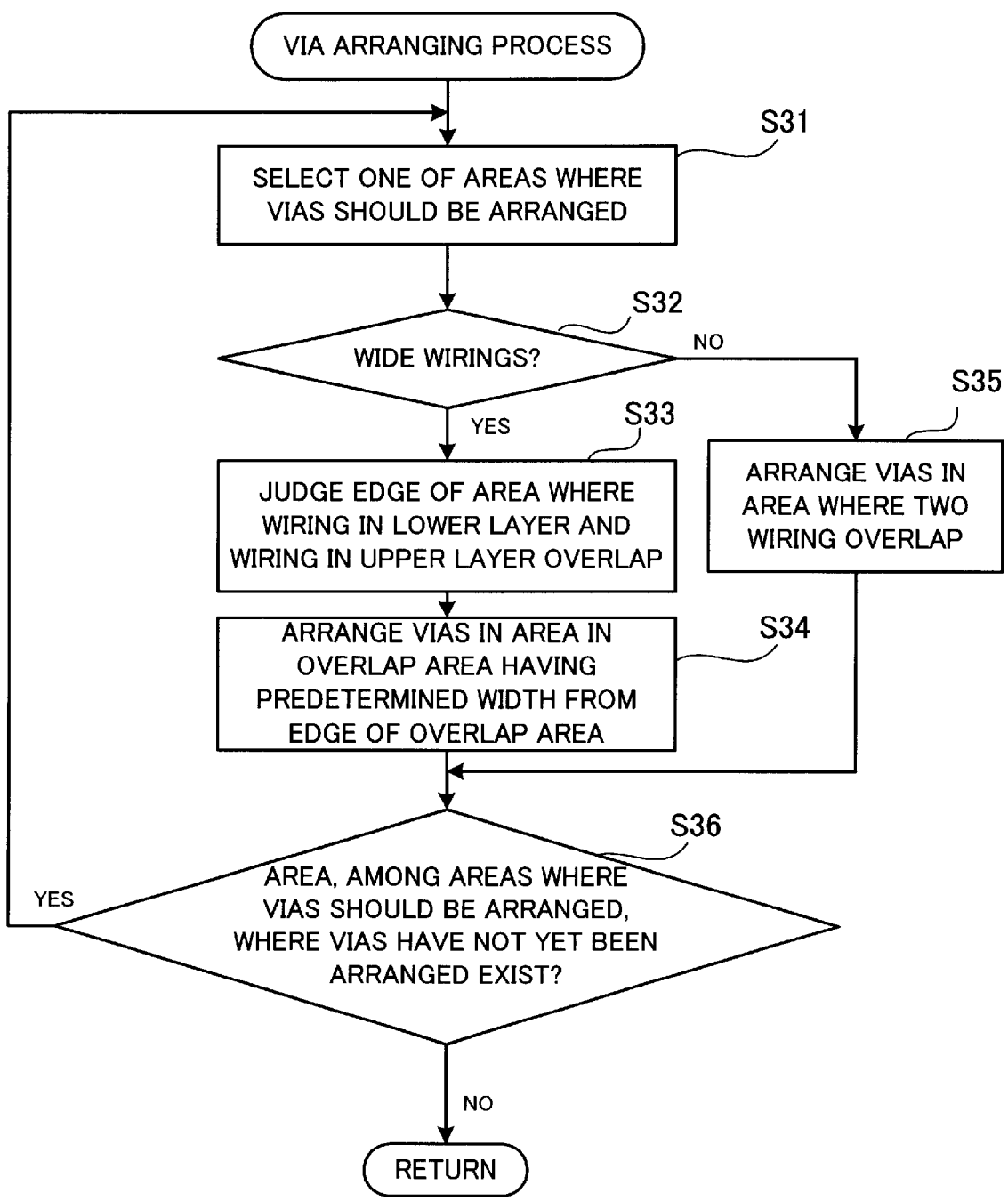
FIG. 16 is a flow chart showing a procedure for arranging vias in a second embodiment of the present invention.

FIG. 16 is a flow chart showing a procedure for arranging vias in the second embodiment of the present invention. This procedure will be performed by the wiring generating section 4 (shown in FIG. 4). Among the processes for arranging vias shown in FIG. 16, steps S31, S32, S35, and S36 are the same as steps S21, S22, S27, and S28 shown in FIG. 6, respectively. Descriptions of them therefore will be omitted.

In step S32 shown in FIG. 16, if a wiring in a lower layer and a wiring in an upper layer are judged to be wide ("YES" in step S32), the edge of an area where the wiring in the lower layer and the wiring in the upper layer overlap is judged (step S33). A plurality of vias are arranged in an area having a predetermined width from its edge in the overlap area (step S34). This width is narrower than or equal to the maximum wiring width. This value is set by a user, for example, before he/she performs the process of arranging vias.

By performing such a via arranging process in all areas where vias should be arranged (where interlayer connection is made), inter-cell wiring data will be generated.

Figure 17:
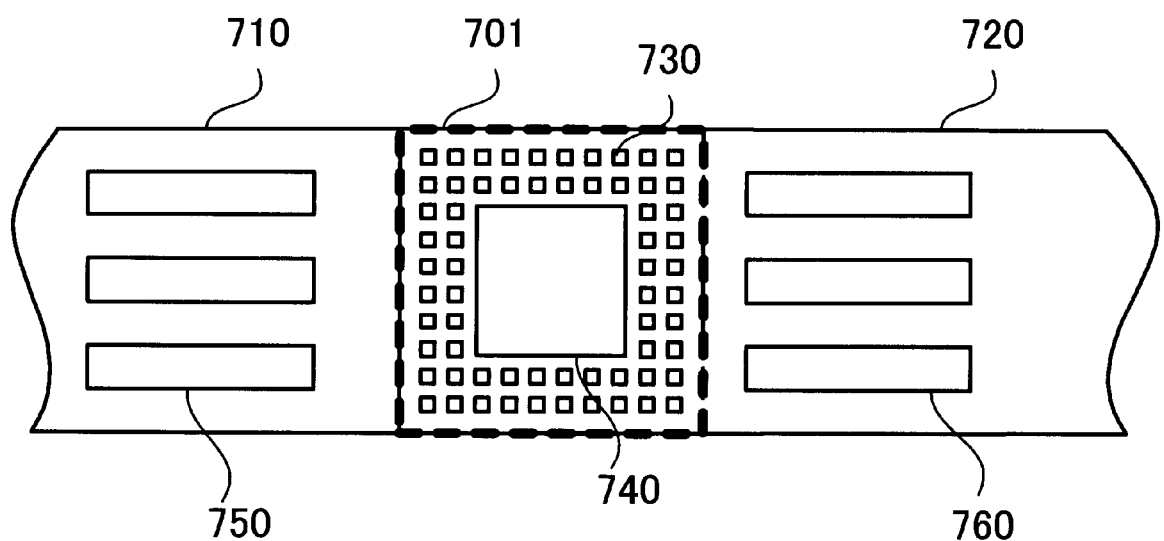
FIG. 17 is a view showing an example of the arrangement of vias in the second embodiment.

FIG. 17 is a view showing an example of the arrangement of vias in the second embodiment. In this example, parallel wirings in different layers are connected. The right edge portion of a wiring 710 in a lower layer and the left edge portion of a wiring 720 in an upper layer overlap. In the second embodiment, an edge 761 (shown in FIG. 17 by a thick dashed line) of an area where the two wirings overlap is judged. Then a plurality of vias 730 are arranged along the edge 701. The plurality of vias 730 are arranged only in an area of a predetermined width from the edge 701. A pillar 740 is generated in an area surrounded by the plurality of vias 730. A plurality of pillars 750 are formed in an area in the wiring 710 in the lower layer where the wiring 710 and the wiring 720 in the upper layer do not overlap. A plurality of pillars 760 are formed in an area in the wiring 720 in the upper layer where the wiring 720 and the wiring 710 in the lower layer do not overlap.

As stated above, in the second embodiment, the edge of an area where wirings overlap is judged and vias are arranged along the edge. Therefore, even if two wirings which overlap are parallel, vias can be arranged in an annular area around a pillar.

Figure 18:
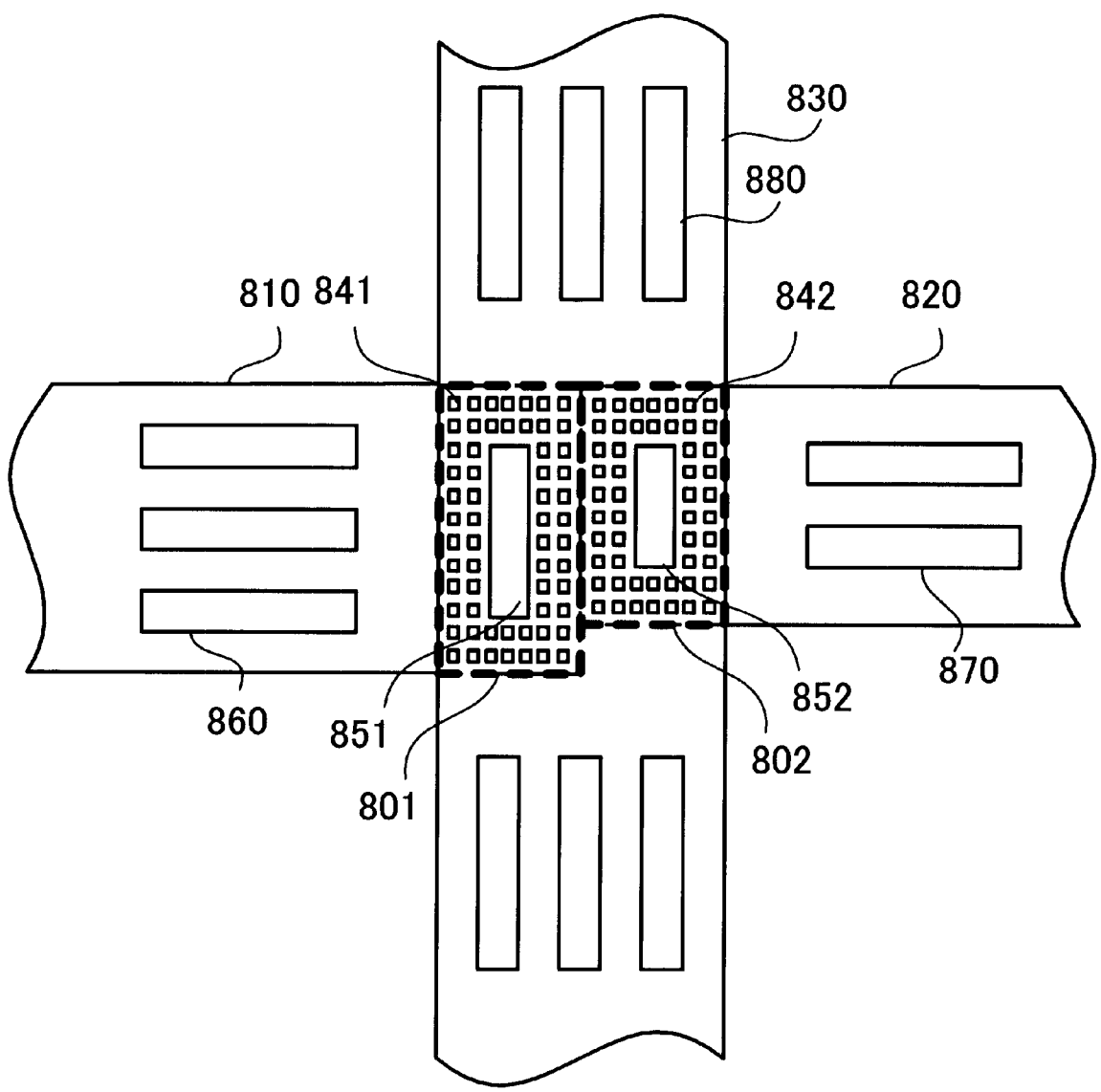
FIG. 18 is a view showing a modification of the arrangement of vias in the second embodiment.

FIG. 18 is a view showing a modification of the arrangement of vias in the second embodiment. In this example, interlayer connection for connecting two wirings 810 and 820 in a lower layer and a wiring 830 in an upper layer is made at a place where the two wirings 810 and 820 are connected. If the second embodiment of the present invention is applied to a via arranging process in such interlayer connection, the edge of an area where the wiring 810 in the lower layer and the wiring 830 in the upper layer overlap is judged.

In this example, of first, an edge 801 (shown in FIG. 18 by a thick dashed line) of an area where the wiring 810 in the lower layer and the wiring 830 in the upper layer overlap is judged. A plurality of vias 841 are arranged annularly in an area of a predetermined width along the edge 801. A pillar 851 is formed in an area surrounded by the plurality of vias 841. Then an edge 802 (shown in FIG. 18 by a thick dashed line) of an area where the wiring 820 in the lower layer and the wiring 830 in the upper layer overlap is judged. A plurality of vias 842 are arranged annularly in an area of a predetermined width along the edge 802. A pillar 852 is formed in an area surrounded by the plurality of vias 842.

In addition, a plurality of pillars 860 are formed in an area in the wiring 810 in the lower layer where the wiring 810 and the wiring 830 in the upper layer do not overlap. A plurality of pillars 870 are formed in an area in the wiring 820 in the lower layer where the wiring 820 and the wiring 830 in the upper layer do not overlap. A plurality of pillars 880 are formed in an area in the wiring 830 in the upper layer where the wiring 830 and the two wiring 810 and 820 in the lower layer do not overlap.

As shown in FIG. 18, even if two wirings in a lower layer exist in an area where vias should be arranged, the vias can be arranged on a connection terminal where wiring width is narrow. As shown in FIG. 18, in the second embodiment, vias 841 and 842 are arranged so that they entirely surround pillars 851 and 852 respectively. Therefore, by applying the second embodiment, a pillar will be formed in the middle of an area where interlayer connection should be made, and vias will be arranged around it. In this case, it does not matter how two wirings overlap. That is to say, by applying the second embodiment, a plurality of vias can always be arranged in an area which entirely surrounds a pillar.

By the way, in the first and second embodiments of the present invention, one rectangular pillar is formed in an area in a wiring where interlayer connection should be made. A plurality of pillars, however, may be formed. A modification of a pillar generated will now be described.

Figure 19:
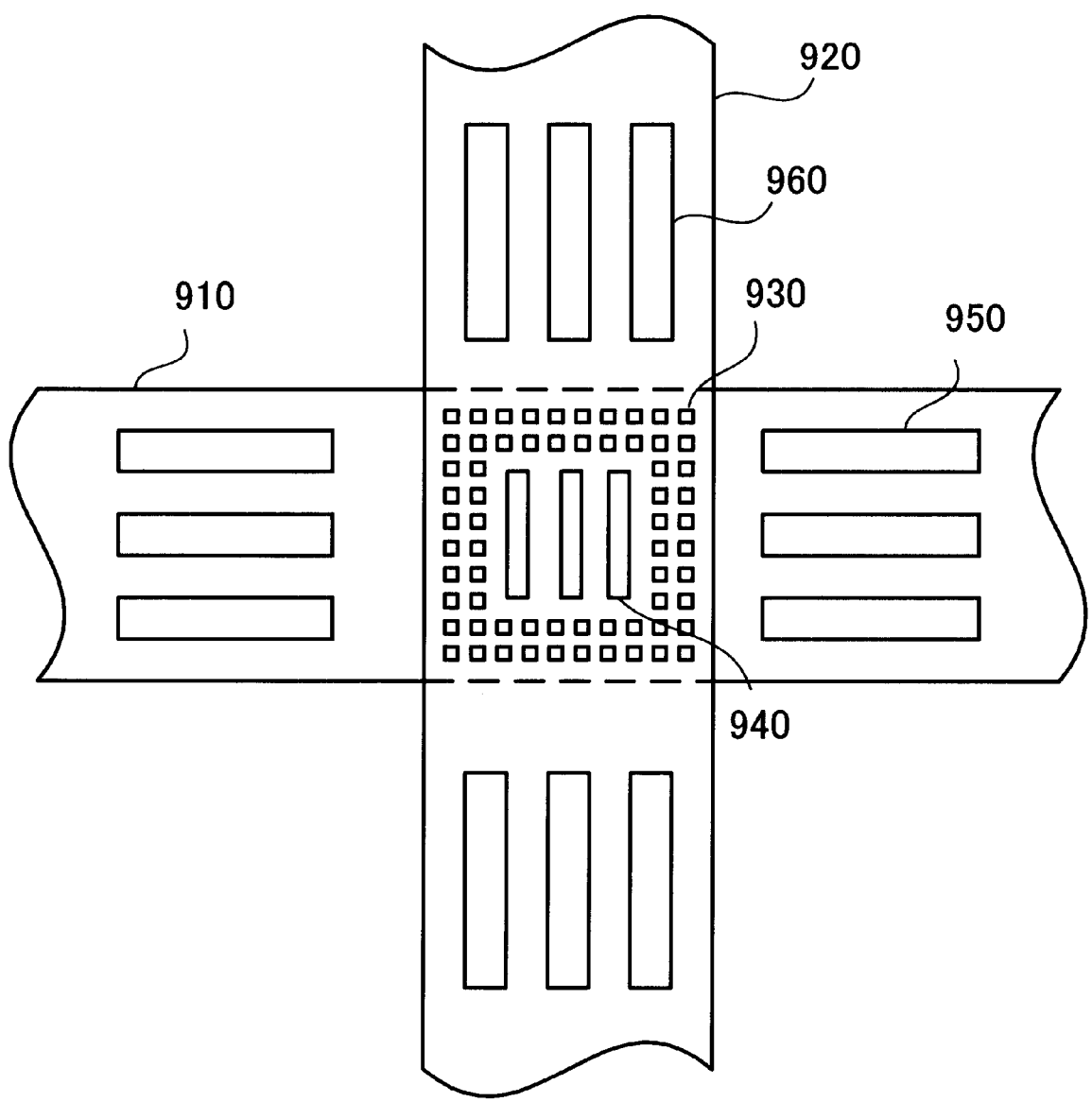
FIG. 19 is a view showing a first modification of the arrangement of a pillar.

FIG. 19 is a view showing a first modification of the arrangement of a pillar. In this example, a plurality of vias 930 are arranged annularly along the edge of an area where a wiring 910 in a lower layer and a wiring 920 in an upper layer overlap.

A plurality of pillars 940 are located in an area surrounded by the plurality of vias 930. In this example, each of the plurality of pillars 940 is rectangular. Moreover, they are arranged in parallel with one another. Furthermore, a pillar 950 is located in an area in the wiring 910 where the wiring 910 and the wiring 920 do not overlap. A pillar 960 is located in an area in the wiring 920 where the wiring 920 and the wiring 910 do not overlap.

As shown in FIG. 19, a plurality of pillars 940 may be formed in an area where the wiring 910 in the lower layer and the wiring 920 in the upper layer overlap.

Figure 20:
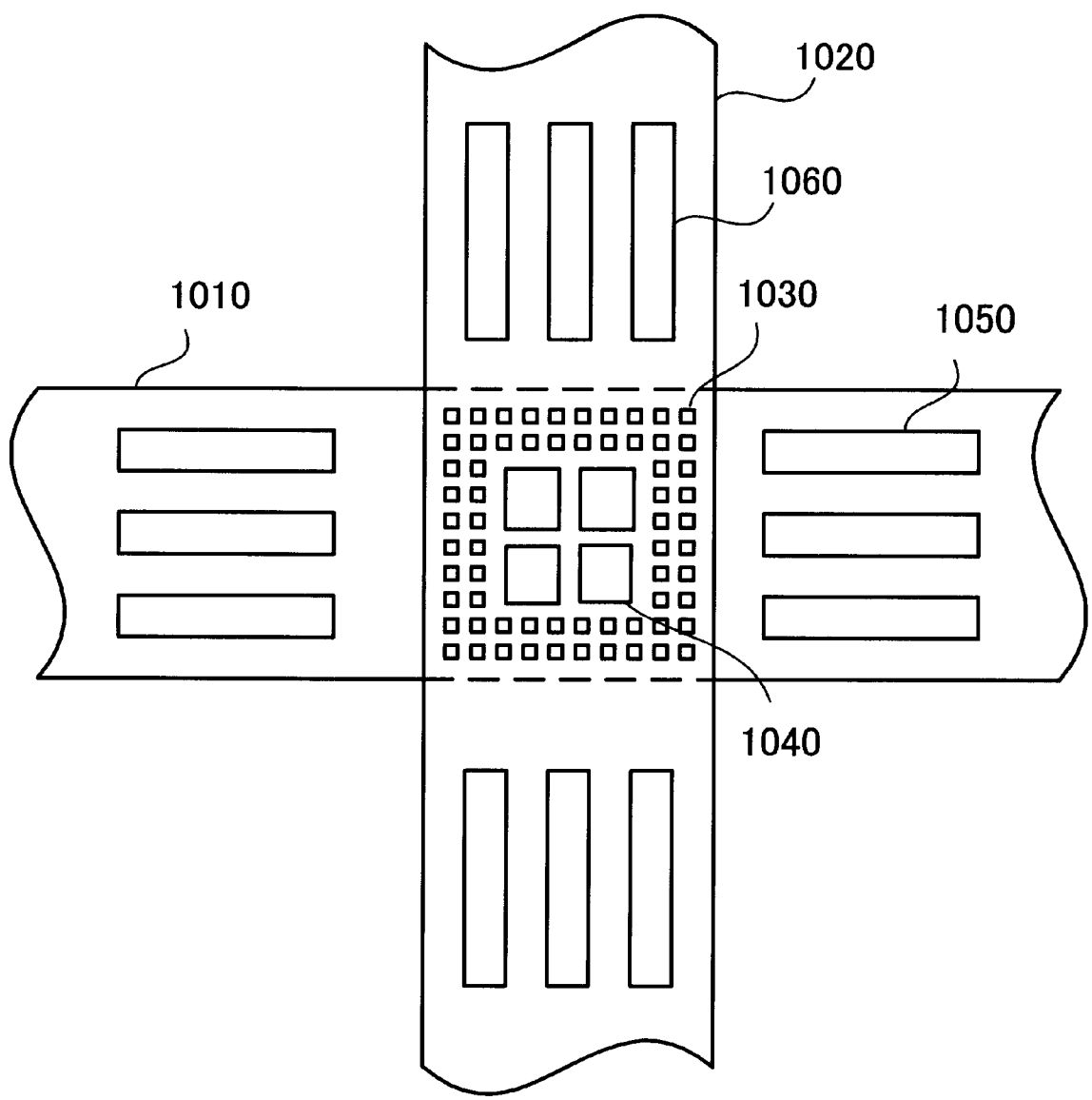
FIG. 20 is a view showing a second modification of the arrangement of a pillar.

FIG. 20 is a view showing a second modification of the arrangement of a pillar. In this example, a plurality of vias 1030 are arranged annularly along the edge of an area where a wiring 1010 in a lower layer and a wiring 1020 in an upper layer overlap.

A plurality of pillars 1040 are located in an area surrounded by the plurality of vias 1030. In this example, each of the plurality of pillars 1040 is square. Moreover, they are arranged on a grid. A pillar 1050 is located in an area in the wiring 1010 where the wiring 1010 and the wiring 1020 do not overlap. A pillar 1060 is located in an area in the wiring 1020 where the wiring 1020 and the wiring 1010 do not overlap.

As shown in FIG. 20, a plurality of square pillars may be formed in an area where the wiring 1010 in the lower layer and the wiring 1020 in the upper layer overlap.

In the above embodiments and modifications, a rectangular pillar is formed. The shape of a pillar, however, may be elliptic or circular.

The above processing functions can be achieved with a computer. In that case, the contents of functions which a semiconductor device must have are described in a program recorded on a record medium which can be read with a computer. The above processes are achieved with a computer by executing this program on the computer. A record medium which can be read with a computer can be a magnetic recording medium, a semiconductor memory, or the like. In order to place this program on the market, it can be stored on a portable record medium, such as a compact disk read only memory (CD-ROM) or a floppy disk. Alternatively, a program according to the present invention can be stored in a memory of a computer connected to a network and be transferred to another computer via the network. When this program is executed on a computer, it is stored on, for example, a hard disk in the computer and is loaded into a main memory.

In the above embodiments vias are arranged in two rows, but vias may be arranged in three or more rows according to the extent of an area where the vias are arranged and to the size of the vias. Alternatively, vias may be arranged in a row.

Furthermore, in the above embodiments, a via arranging process according to the present invention is performed when the width of wirings both in a lower layer and in an upper layer exceeds the maximum wiring width. A via arranging process according to the present invention, however, may be performed when the width of a wiring in one of lower and upper layers exceeds the maximum wiring width.

As has been described in the foregoing, in the present invention, vias are generated annularly in an area where a first wiring and a second wiring overlap. As a result, a pillar etc. can be generated in an area where vias are not generated. Interlayer interconnection therefore can be made reliably by a plurality of vias. In addition, by narrowing wiring width at a connection terminal, the occurrence of a hillock of an aluminum wiring around a connection terminal, the occurrence of the roundness of an aluminum wiring at the edge portion of a connection terminal, and the occurrence of dishing on the top of a copper wiring at a connection terminal can be prevented. This will improve a yield in the process for manufacturing semiconductor integrated circuit device.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A semiconductor integrated circuit device with a multi-layer wiring structure, comprising:
    a first wiring located in a first layer;
    a second wiring located in a second layer laid over the first layer;
    a plurality of vias formed between the first layer and the second layer and arranged annularly in an area where the first wiring and the second wiring overlap; and
    a pillar of an insulating material which is formed in an area in the first wiring surrounded by the plurality of vias.

2. The semiconductor integrated circuit device according to claim 1, wherein the plurality of vias are arranged almost uniformly in an annular area.

3. The semiconductor integrated circuit device according to claim 1, wherein the plurality of vias are arranged in an annular area, except in part of the annular area.

4. The semiconductor integrated circuit device according to claim 1, wherein the plurality of vias are arranged along an edge of an area where the first wiring and the second wiring overlap.

5. A circuit design apparatus for designing interlayer interconnection in semiconductor integrated circuits with a multi-layer wiring structure, the apparatus comprising:
    first virtual wiring generating means for generating a first virtual wiring being narrower than a first wiring in a first layer;
    first via generating means for generating at least one via in an area between a second wiring in a second layer laid over the first layer and the first virtual wiring generated by the first virtual wiring generating means;

second virtual wiring generating means for generating a second virtual wiring being narrower than the second wiring in the second layer; and second via generating means for generating at least one via in an area between the first wiring and the second virtual wiring generated by the second virtual wiring generating means.

6. The circuit design apparatus according to claim 5, wherein the first virtual wiring generating means generates a virtual wiring along an edge of the first wiring, further wherein the second virtual wiring generating means generates a virtual wiring along an edge of the second wiring.

7. The circuit design apparatus according to claim 5, further comprising pillar arranging means for arranging a pillar of an insulating material in an area on the first wiring surrounded by a plurality of vias generated by the first via generating means and the second via generating means.

8. The circuit design apparatus according to claim 5, further comprising width judging means for judging whether or not the width of the first wiring and the second wiring is wider than or equal to a maximum wiring width set in advance, wherein the first virtual wiring generating means and the second virtual wiring generating means generate narrow virtual wirings when the width judging means judges that the width of both of the first wiring and the second wiring is wider than or equal to the maximum wiring width.

9. A circuit design apparatus for designing interlayer interconnection in semiconductor integrated circuits with a multi-layer wiring structure, the apparatus comprising:

edge judging means for judging an edge of an area where a first wiring in a first layer and a second wiring in a second layer overlap; and via generating means for generating a plurality of vias in an annular area of a predetermined width from the edge.

10. The circuit design apparatus according to claim 9, further comprising pillar arranging means for arranging a pillar of an insulating material in an area in the first wiring surrounded by the plurality of vias generated by the via generating means.

11. A circuit design method for designing interlayer interconnection in semiconductor integrated circuits with a multi-layer wiring structure, the method comprising the steps of:

generating a first virtual wiring being narrower than a first wiring in a first layer;

generating a via in an area between a second wiring in a second layer laid over the first layer and the first virtual wiring;

generating a second virtual wiring being narrower than the second wiring in the second layer; and generating a via in an area between the first wiring and the second virtual wiring.

12. The circuit design method according to claim 11, wherein the first virtual wiring is generated along an edge of the first wiring in the step of generating the first virtual wiring, further wherein the second virtual wiring is generated along an edge of the second wiring in the step of generating the second virtual wiring.

13. The circuit design method according to claim 11, wherein a pillar of an insulating material is arranged in an area surrounded by a plurality of vias generated.

14. The circuit design method according to claim 11, further comprising the steps of:

judging whether or not the width of the first wiring and the second wiring is wider than or equal to a maximum wiring width set in advance; and generating narrow virtual wirings only when the width of both of the first wiring and the second wiring is judged to be wider than or equal to the maximum wiring width.

15. A circuit design method for designing interlayer interconnection in semiconductor integrated circuits with a multi-layer wiring structure, the method comprising the steps of:

judging an edge of an area where a first wiring in a first layer and a second wiring in a second layer overlap; and generating a plurality of vias in an annular area of a predetermined width from the edge.

16. The circuit design method according to claim 15, wherein a pillar of an insulating material is arranged in an area in the first wiring surrounded by the plurality of vias.

* * * * *